United States Patent
Bourmaud

(10) Patent No.: US 10,019,801 B2
(45) Date of Patent: Jul. 10, 2018

(54) IMAGE ANALYSIS SYSTEM AND METHOD

(71) Applicant: Kabushiki Kaisha Toshiba, Minato-ku (JP)

(72) Inventor: Guillaume Bourmaud, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 44 days.

(21) Appl. No.: 15/237,839

(22) Filed: Aug. 16, 2016

(65) Prior Publication Data
US 2017/0262992 A1    Sep. 14, 2017

Related U.S. Application Data

(60) Provisional application No. 62/306,959, filed on Mar. 11, 2016.

(51) Int. Cl.
*G06T 7/00* (2017.01)

(52) U.S. Cl.
CPC ........ *G06T 7/0044* (2013.01); *G06T 2200/32* (2013.01); *G06T 2207/10016* (2013.01); *G06T 2207/10028* (2013.01); *G06T 2207/30244* (2013.01)

(58) Field of Classification Search
CPC .... G06T 7/30; G06T 7/38; G06T 7/55; G06T 7/579; G06T 7/593; G06T 7/70; G06T 7/97
See application file for complete search history.

(56) References Cited

U.S. PATENT DOCUMENTS

| 4,969,036 A | * | 11/1990 | Bhanu et al. ................. 358/105 |
| 2012/0063638 A1 | * | 3/2012 | Lim et al. ..................... 382/103 |
| 2015/0235367 A1 | * | 8/2015 | Langer et al. ........ G06T 7/0042 348/135 |
| 2015/0294474 A1 | * | 10/2015 | Grandin et al. ...... G06T 7/0071 348/50 |

(Continued)

OTHER PUBLICATIONS

Venu Madhav Govindu. "Combining Two-view Constraints for Motion Estimation," 0-7695-1272-0/01, 2001 IEEE, pp. II-218-II-225.

(Continued)

*Primary Examiner* — Andrew W Johns
(74) *Attorney, Agent, or Firm* — Oblon, McClelland, Maier & Neustadt, L.L.P.

(57) ABSTRACT

A method of determining a camera movement expressed in terms of an absolute transformation of a camera state from a reference state, including receiving a stream of video images captured from a camera; producing a stream of odometry measurements from the video images determining the relative transform of the camera state between consecutive images or consecutive sets of images; producing a stream of loop closure measurements from the video images by determining the relative transform of the camera state between non-consecutive images or non-consecutive sets of images; and estimating the absolute transform of the camera state from a posterior distribution of the relative transformations over the odometry measurements and the loop closure measurements, wherein the posterior distribution is approximated by a factorized distribution which assumes that the relative transformations are mutually independent.

20 Claims, 15 Drawing Sheets

(56) References Cited

U.S. PATENT DOCUMENTS

2017/0287162 A1* 10/2017 Wasik et al. .............. G06T 7/73

OTHER PUBLICATIONS

Venu Madhav Govindu, "Lie-Algebraic Averaging for Globally Consistent Motion Estimation," Proceedings of the 2004 IEEE Computer Society Conference on Computer Vision and Pattern Recognition (CVPR'04).

Estrada et al. "Hierarchical SLAM: Real-Time Accurate Mapping of Large Environments," IEEE Transactions on Robotics, vol. 21, No. 4, Aug. 2005, pp. 588-596.

Venu Madhav Govindu, "Robustness in Motion Averaging," P.J. Narayanan et al. (Eds.): ACCV 2006, LNCS 3852, pp. 457-466, 2006.

Caballero et al. "Homography Based Kalman Filter for Mosaic Building. Applications to UAV position estimation," 2007 IEEE International Conference on Robotics and Automation. Roma, Italy, Apr. 10-14, 2007. pp. 2004-2009.

Zach et al. "What Can Missing Correspondences Tell Us About 3D Structure and Motion?" 978-1-4244-2243-2/08, 2008 IEEE.

Grisetti et al. "Nonlinear Constraint Network Optimization for Efficient Map Learning" IEEE Transactions on Intelligent Transportation Systems, vol. 10, No. 3, Sep. 2009. pp. 428-439.

Zach et al. "Disambiguating Visual Relations Using Loop Constraints." 978-1-4244-6985-7/10, 2010 IEEE, pp. 1426-1433.

Meidow, Jochen, "Efficient Video Mosaicking by Multiple Loop Closing" U. Stilla et al. (Eds.): PIA 2011, LNCS 6952, pp. 1-12, 2011.

Hartley et al. "Rotation Averaging" Published online: Jan. 30, 2013, International Journal of Computer Vision, ISSN 0920-5691. Int J Comput Vis DOI 10.1007/s11263-012-0601-0.

Boumal et al."Robust estimation of rotations from relative measurements by maximum likelihood" 52nd IEEE Conference on Decision and Control Dec. 10-13, 2013. Florence, Italy. pp. 1156-1161.

Chatterjee et al "Efficient and Robust Large-Scale Rotation Averaging" 2013 IEEE International Conference on Computer Vision, DOI 10.1109/ICCV.2013.70. pp. 521-528.

Tron et al. "Statistical Pose Averaging with Non-isotropic and Incomplete Relative Measurements" D. Fleet et al. (Eds.): ECCV 2014, Part V, LNCS 8693, pp. 804-819, 2014.

Carlone et al. "A fast and accurate approximation for planar pose graph optimization" The International Journal of Robotics Research 2014, vol. 33(7) 965-987.

Dubbelman et al. "COP-SLAM: Closed-Form Online Pose-Chain Optimization for Visual SLAM" IEEE Transactions on Robotics, vol. 31, No. 5, Oct. 2015, pp. 1194-1213.

Choi et al, "Robust Reconstruction of Indoor Scenes" 978-1-4673-6964-0/15 2015 IEEE pp. 5556-5565.

Bourmaud et al. "Global Motion Estimation from Relative Measurements in the Presence of Outliers" D. Cremers et al. (Eds.): ACCV 2014, Part V, LNCS 9007, pp. 366-381, 2015. DOI: 10.1007/978-3-319-16814-2 24.

Roberts et al. "Structure from motion for scenes with large duplicate structures" 2011 IEEE Conference on Computer Vision and Pattern Recognition (CVPR) pp. 3137-3144.

Engel et al. "LSD-SLAM: Large-Scale Direct Monocular SLAM" D. Fleet et al. (Eds.): ECCV 2014, Part II, LNCS 8690, pp. 834-849, 2014.

Kummerle et al. "g2o: A General Framework for Graph Optimization" 2011 IEEE International Conference on Robotics and Automation Shanghai International Conference Center May 9-13, 2011, Shanghai, China, pp. 3607-3613.

Zhang et al. "LOAM: Lidar Odometry and Mapping in Real-time" *Robotics: Science and Systems Conference (RSS)*, Jul. 2014.

Chirikjian, Gregory S. "Stochastic Models, Information Theory, and Lie Groups, vol. 2, Analytic Methods and Modem Applications" 2011.

Agarwal et al. "Robust Map Optimization using Dynamic Covariance Scaling" 2013 IEEE International Conference on Robotics and Automation (ICRA) Karlsruhe, Germany, May 6-10, 2013, pp. 62-69.

Sunderhauf et al. "Switchable Constraints for Robust Pose Graph SLAM" 2012 IEEE/RSJ International Conference on Intelligent Robots and Systems Oct. 7-12, 2012. Vilamoura, Algarve, Portugal, pp. 1879-1884.

Zach, Christopher, "Robust Bundle Adjustment Revisited" D. Fleet et al. (Eds.): ECCV 2014, Part V, LNCS 8693, pp. 772-787, 2014.

Latif et al. "Robust loop closing over time for pose graph SLAM" The International Journal of Robotics Research 32(14) 1611-1626 The Author(s) 2013.

Meidow, Jochen "Eficient Multiple Loop Adjustment for Computer Vision Tasks" PFG 2012 / 5, 0501-0510 Stuttgart, Oct. 2012.

Bishop, Christopher M. "Pattern Recognition and Machine Learning" ISBN-10: 0-387-31073-8 , ISBN-13: 978-0387-31073-2, 2006.

Latif et al. "Robust Graph SLAM Back-ends: A Comparative Analysis" 2014 IEEE/RSJ International Conference on Intelligent Robots and Systems (IROS 2014) Sep. 14-18, 2014, Chicago, IL, USA, pp. 2683-2690.

Geiger, et al. "Vision meets robotics: The KITTI dataset" The International Journal of Robotics Research 32(11) 1231-1237 2013.

* cited by examiner

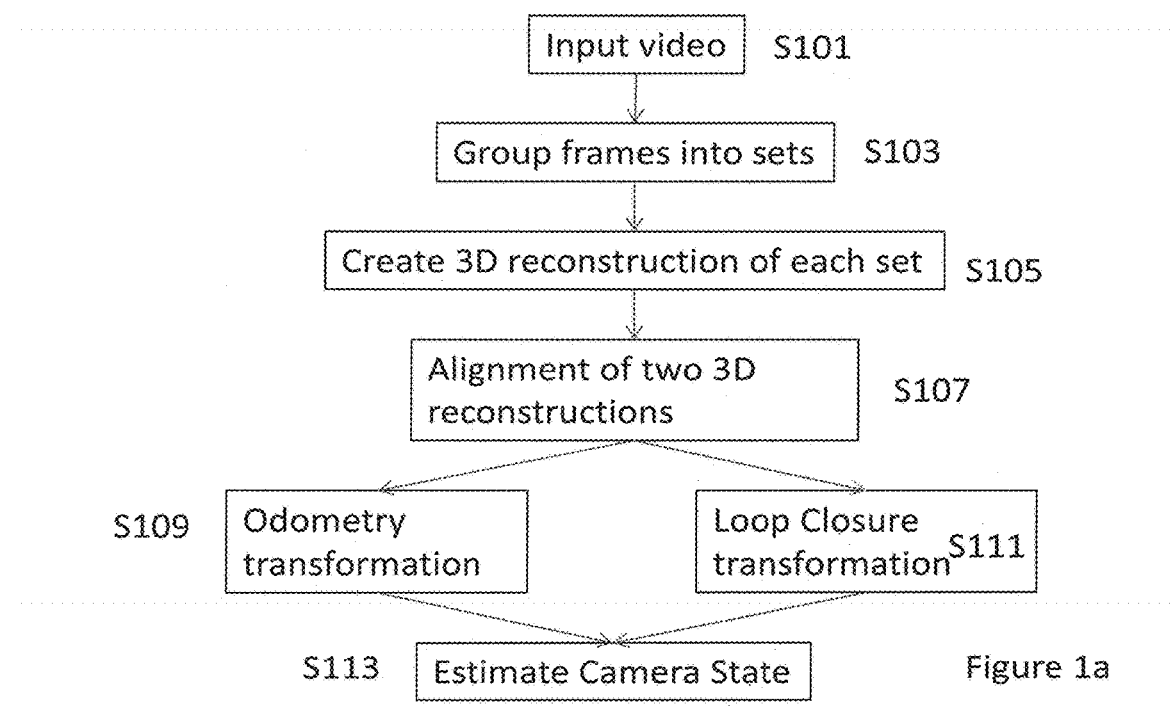
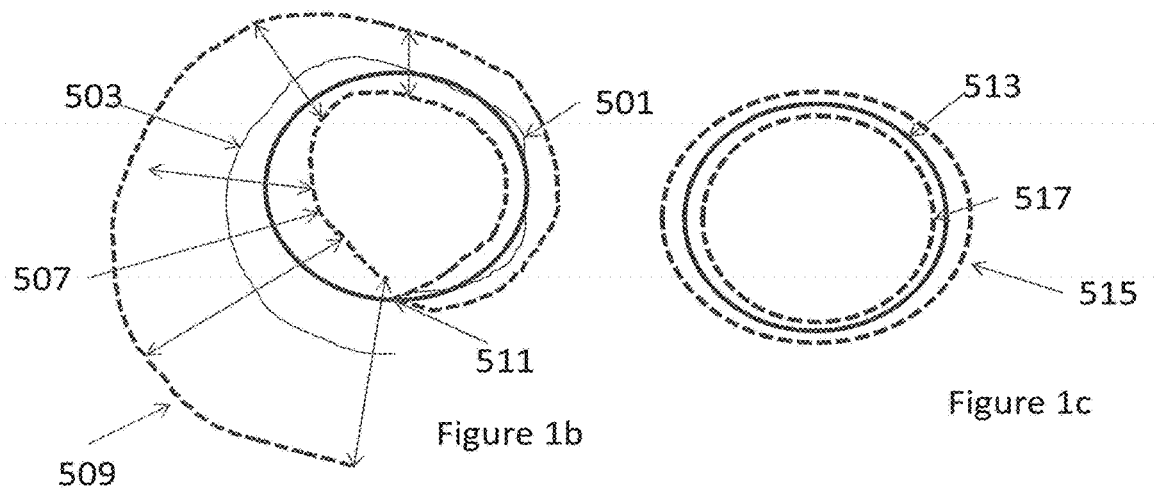
Figure 1b
Figure 1c

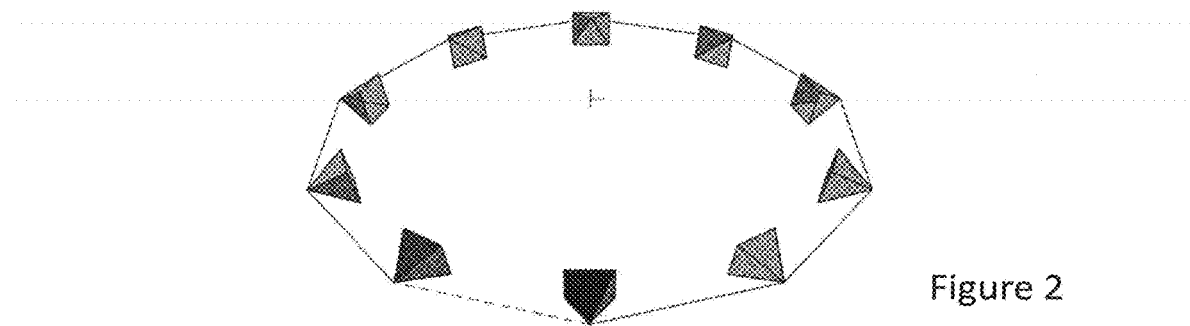
Figure 2
Figure 3(a)  Figure 3(b)  Figure 3(c)
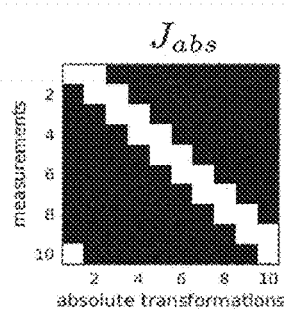 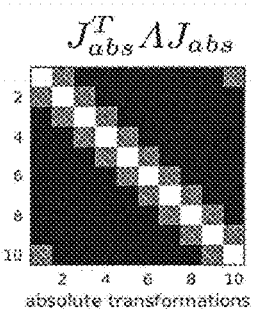 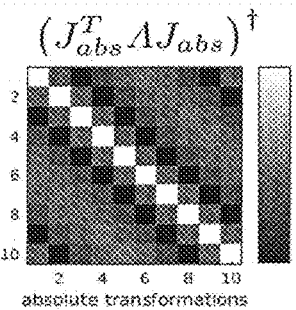
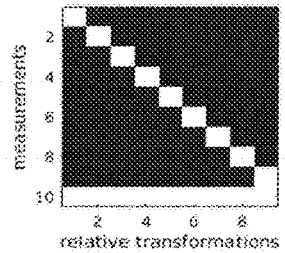 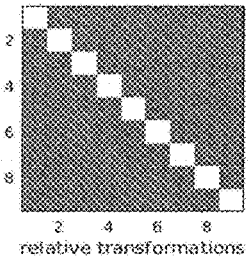 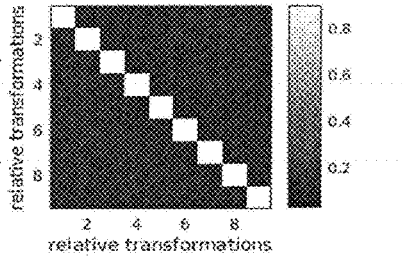
Figure 3(d)  Figure 3(e)  Figure 3(f)

1 – System
3 – Processor
5 – Program
7 – Storage
11 – Input module
13 – Output module
15 – Input
17 – Output

IMAGE ANALYSIS SYSTEM AND METHOD

RELATED APPLICATIONS

This application is based upon and claims the benefit of priority from U.S. Provisional Application No. 62/306,959, filed on Mar. 11, 2016, the entire contents of which are incorporated herein by reference.

FIELD

Embodiments of the present invention as described herein are generally concerned with the field of image analysis systems and methods.

BACKGROUND

In many image analysis tasks there is a need to have a camera that is moving relative to the scene from which it is capturing images. One such task is so-called SLAM (Simultaneous localisation and mapping) where a camera will be provided on a moving object and there the camera will need to visualise the scene and record information to determine its pose. Such SLAM tasks are encountered in robotics, autonomous vehicles etc.

When estimating the pose of the camera, one approach is to estimate the change in the camera pose from its previous pose, thus estimating a relative transformation. Estimating the camera pose by compounding relative transformations alone causes a drift as the are highly affected by noise.

This motion averaging problem, also called "multiple rotation averaging" when dealing with 3D rotations or "pose-graph inference" when applied to camera poses, has been the subject of much research. Although mentioned above in relation to SLAM, the generic problem of estimating the camera state also occurs in other applications such as video mosaicking and the reconstruction of 3D scenes.

BRIEF DESCRIPTION OF THE DRAWINGS

Systems and methods in accordance with non-limiting embodiments will now be described with reference to the accompanying figures in which:

FIG. 1(a) is a flow chart of a method in accordance with an embodiment of the present invention; FIG. 1(b) is a rough schematic showing a possible predicted path and variance of a moving camera derived from odometry measurements alone; and FIG. 1(c) is a rough schematic of the estimated path and variance shown in FIG. 1(b) corrected by a loop closure measurement;

FIG. 2 is a schematic showing the state of a camera changing through a single complete loop;

FIG. 3(a) is a representation of the Jacobian matrix for absolute parameterisation; FIG. 3(b) is a is a representation of the pseudo-Hessian matrix for absolute parameterisation; FIG. 3(c) is a representation of the inverse pseudo-Hessian matrix for absolute parameterisation; FIG. 3(d) is a representation of the Jacobian matrix for relative parameterisation; FIG. 3(e) is a is a representation of the pseudo-Hessian matrix for relative parameterisation and FIG. 3(f) is a representation of the inverse pseudo-Hessian matrix for relative parameterisation;

Figure 4:
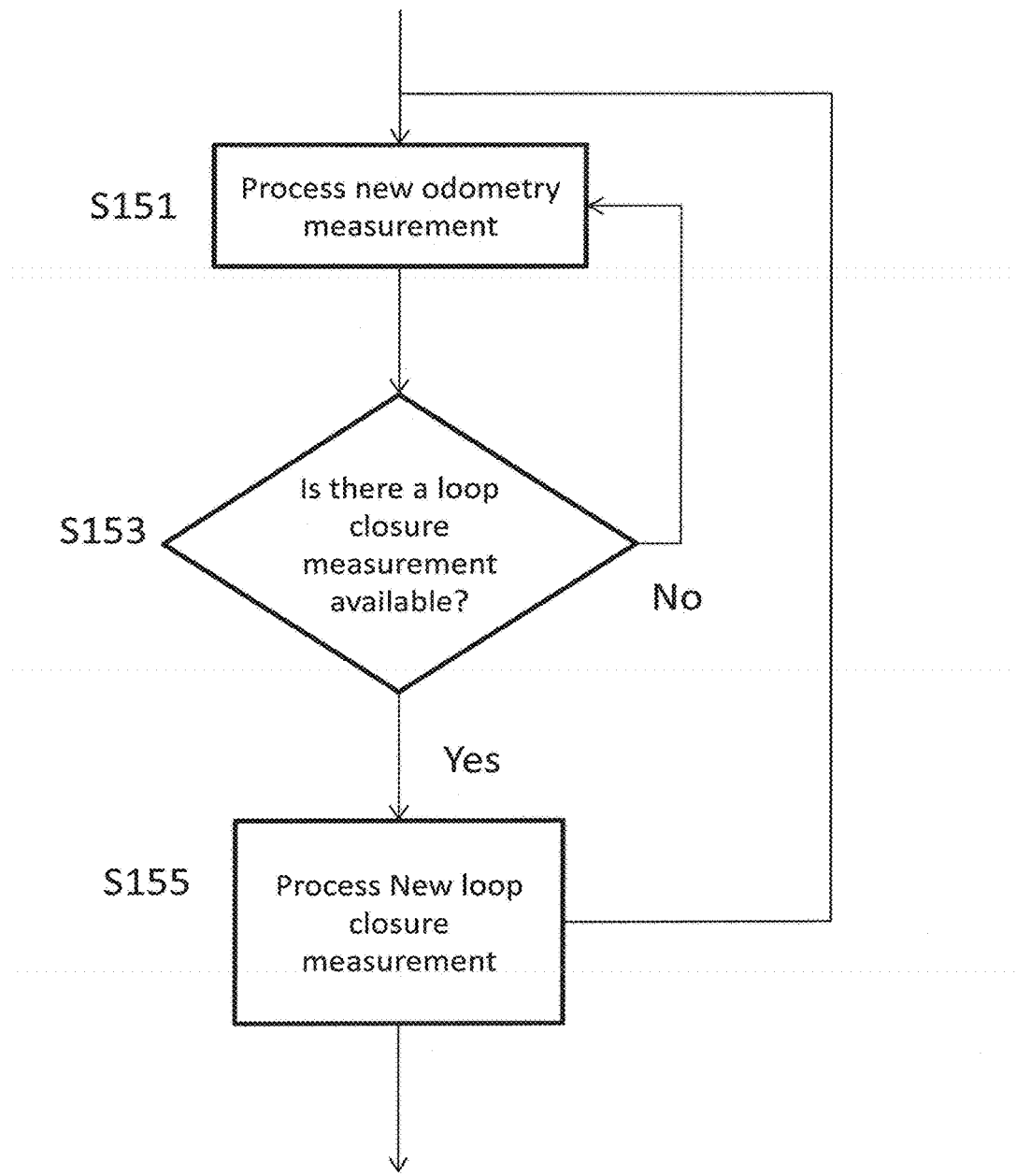
FIG. 4 is a flow chart showing the steps in accordance with an embodiment for processing an odometry measurements and closed loop measurements.

In an embodiment, the present invention provides a method of determining the movement of a camera, wherein the movement is expressed in terms of an absolute transformation of the camera state from a reference state, the method comprising:

receiving a stream of video images captured from said camera;

producing a stream of odometry measurements from said video images determining the relative transform of the camera state between consecutive images or consecutive sets of images;

producing a stream of loop closure measurements from said video images by determining the relative transform of the camera state between non-consecutive images or non-consecutive sets of images;

estimating the absolute transform of the camera state from a posterior distribution of the relative transformations over the odometry measurements and the loop closure measurements, wherein the posterior distribution is approximated by a factorised distribution which assumes that the relative transformations are mutually independent.

In the above embodiment, the input data is a video stream, and an online estimation of the absolute transformations is produced.

The above method does not minimise a criteria or cost function over all past measurements each time a new measurement is received. In order to achieve a low computational time, the above method performs filtering, i.e. it processes each measurement one by one. In the above method, the posterior distribution of the estimated transformations is continuously approximated such that the number of parameters of that distribution grows at most linearly with the number of estimated transformations.

In an embodiment of the above method, the factorised distribution over the relative transformations involved in the loop is re-estimated each time a new loop closure measurement for the same loop is received. Further, the parameters of the factorised distribution are retained after each estimate. In an embodiment, the parameters are the estimated mean and covariance of the relative transformations.

It should be noted that, in an embodiment, only the relative transformations that are contained within the loop to which the loop closure measurement relates are updated.

The above method models the total covariance as a block diagonal matrix where the number of blocks on the diagonal is the number of relative transformations in the loop which is being re-estimated due to a loop closure measurement. No other relative transformations are updated except for those in the loop closure being processed.

The size of the blocks is set by the size of the covariance from the original odometry measurements. The size of the covariance of the original measurements it set by the type of measurement. Typically, the size of the block will correspond to the number of degrees of freedom. For example, camera pose will have 6 degrees of freedom and the covariance can be represented by a 6×6 matrix, although it is possible to further compress the size of the matrix, a homography measurement has 8 degrees of freedom and again the size of the matrix can be reduced.

Thus, the number of parameters that need to be re-estimated at any point scales with the number of relative transforms within loop closure measurement, this allows the system to operate and process measurements in real time as opposed to only via an off-line batch operation.

As explained above, embodiments allow online estimation for large scale problems. When a new measurement is received, there is no need to re-calculate the absolute transform on the basis of all the past data. As explained above, just the parameters of the factorised distribution are retained. Thus, the raw odometry measurements and loop closure measurements may be discarded once the parameters for the updated factorised distribution have been determined.

Dealing with large scale problems increases the risk of perceptual aliasing and consequently the number of wrong loop closures. Hence, in an embodiment, incorrect loop closures are detected and removed. In an embodiment a loop closure measurement is determined to be valid by comparing it with previous values for the parameters of the factorised distribution for the said loop and a gating threshold.

The above method can be adapted to 2D or 3D images. 3D images can be determined from a single camera using monocular techniques. Here, a number of 2D frames are combined to produce a 3D point cloud. In a further embodiment, two or more cameras with a known geometrical relationship are used and 3D point clouds are determined using known stereo methods.

For example, at least one further camera may be provided with a known fixed relationship to said camera and the odometry measurements and the loop closure measurements are provided from the camera and said at least one further camera using stereo methods.

In the above, the video frames obtained by the camera are combined to determined 3D point clouds and said odometry measurements and loop closure measurements are determined from said 3D point clouds.

In an embodiment, the above method is applied to so-called SLAM (simultaneous localisation and mapping) tasks, comprising moving a camera in a region, obtaining image data from said camera and estimating the absolute transform of the camera as explained above, wherein the absolute transform of the camera position is used to determine the position of the camera in the region, the method further comprising mapping the region using the image data from the camera and the position of the camera from the determined absolute transformations.

The camera may be located on a moving object, such as a car, robot, autonomous vehicle.

The above method may also be applied to 2D images where the odometry measurement and loop closure measurements are determined from 2D homographies determined between 2D image frames.

In an embodiment, this is applied to video mosaicking, where the method comprises moving a camera over an area, obtaining image data from said camera and estimating the absolute transform of the camera using the above method, wherein the absolute transform of the camera position is used to determine the position of the camera with respect to the area, and aligning the frames of video using the position of the camera from the determined absolute transformations.

In an embodiment, the factorised distribution is determined by using a variational Bayes approximation. In a further embodiment, the variational Bayes approximation is determined using the Kullback-Leibler divergence.

In an embodiment, the state of the camera will be taken to mean the rotation (alone) of the camera, the position (alone) of the camera, the pose of the camera (which is the position and rotation of the camera) or homography where the camera state is encoded in a homography matrix which represents the relation between 2 images in the same plane.

The transformations may fall within the any Lie groups, for example: SE(3) for 3D euclidean motions, SL(3) for homographies, Sim(3) for 3D similarities.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1(a) is a flow chart showing a method in accordance with an embodiment of the invention.

In the embodiment of FIG. 1(a) and input video signal is received for processing at step S101. In this embodiment, the camera pose is estimated from a sequence of video images. However, this is merely an illustrative embodiment and other applications which rely on the underlying method will be discussed later.

The video frames collected in step S101 will then be grouped into sets in step S103. In an embodiment, these sets are groups of n consecutive frames, where n is an integer of at least 2. In one embodiment, n is between 5 and 10. In other embodiments, n will be varied between sets.

For each set, a 3D reconstruction is created in step S105. There are many possibilities for producing the reconstruction using known methods for creating a 3D point cloud from a series of 2D images. When the point cloud is created, each point in the cloud will represent a probability distribution with a mean (which is the predicted position of the surface of an object in the scene) and a variance in this position.

In step S107, two 3D reconstructions from different sets are aligned and measurement of the 3D similarity between the two reconstructions is determined. This 3D similarity measurement is represented in the form of a mean and covariance of the transformation between the two 3D reconstructions.

Where the similarity is measured between 3D reconstructions taken from consecutive sets, the measured transformation is an odometry transformation S109. When similarity is measured between non-consecutive reconstructions, the measured transformation is a loop closure transformation S111.

As the camera is moved, a sequence of odometry transformations are produced. These are then used to update the camera state in step S113. The camera state can be expressed in terms of the rotation (alone) of the camera, the position (alone) of the camera, the pose of the camera (which is the position and rotation of the camera) and homography where the camera state is encoded in a homography matrix which represents the relation between 2 images in the same plane.

In addition to the odometry measurements, loop closure transform S111 are also combined with the odometry transforms to produce an estimate of the updated camera position in step S113. The mechanism for doing this will be described in more detail with reference to FIGS. 4 to 6b. The method allows a real time accurate estimate of the camera state.

FIG. 1(b) is a rough schematic showing the actual path 501 of a camera. The estimate of the measured path 503 can be seen as diverging from the true circular path. The variance of the measurement is shown as the width between the dotted lines 507, 509.

The loop closure measurement at point 511 can be used to correct the measured path 503 as shown in FIG. 1c, where the corrected path 513 is seen to be close to the real path 501 and there is a substantial reduction in the variance shown by dotted lines 515 and 517.

To understand how the odometry transforms are corrected by the loop closure transforms, the simplified situation of a single loop will first be studied. Such an example is shown in FIG. 2 where a perfect loop of length 10 is illustrates. Each cone represents a camera pose. The odometry measurements are shown as solid lines and the loop closure measurement is shown as a dotted line.

Before considering the situation, the mathematical models and the notation that will be used herein will be described. The theory explained herein can be applied to any matrix Lie group (typically SE(3), SL(3), Sim(3), etc.), which turns out to be very convenient in practice since it allows the framework to be applied to various applications. Chirikjian, G. S.: Stochastic Models, Information Theory, and Lie Groups, Volume 2. Springer-Verlag (2012) gives an overview of Lie Groups useful as background for the principles described herein.

In this application, the following notation will be used: $G \subset R^{n \times n}$ is a matrix Lie group of intrinsic dimension p (i.e. p=6 if $G=SE(3) \subset R^{4 \times 4}$, p=8 if $G=SL(3) \subset R^{3 \times 3}$, etc.); $\exp^{\wedge}_G(\bullet):R^p \to G$ and $\log^{\vee}_G(\bullet):G \to R^p$ correspond to the exponential and logarithm maps of G respectively; $T_{ij} \in G$ is a matrix representing the transformation from the coordinate system j to the coordinate system i, thus in the notations $T_{ij}T_{jk}=T_{ik}$ and $T_{ij}^{-1}=T_{ji}$.

The following discussion will also use the adjoint representation of G, $Ad_G(\bullet):G \to R^{p \times p}$, which allows to transport an element $\delta_{ij} \in R^p$, acting initially on $T_{ij}$ through left multiplication, onto the right side of $T_{ij}$ such that $\exp^{\wedge}_G(\delta_{ij})T_{ij}=T_{ij}\exp^{\wedge}_G(Ad_G(T_{ji})\delta_{ij})$. Finally, the notation for a Gaussian distribution on G is introduced:

$$\mathcal{N}_G(T_{ij}; \bar{T}_{ij}, P_{ij}) \propto e^{-\frac{1}{2}\|\log^{\vee}_G(T_{ij}\bar{T}_{ij}^{-1})\|^2_{P_{ij}}} \iff T_{ij} = \exp^{\wedge}_G(\epsilon_{ij})\bar{T}_{ij} \quad (1)$$

where $\epsilon_{ij} \sim \mathcal{N}_{R^p}(\epsilon_{ij}; 0, P_{ij})$ where $\|\bullet\|^2$ stands for the squared Mahalanobis distance while $T_{ij}$ and $P_{ij}$ are the mean and the covariance of the random variable $T_{ij}$ respectively.

It is possible to tackle the motion averaging problem, two different parameterizations of the absolute transformations are commonly used: the relative parameterization and the absolute parameterization. Different parameterizations lead to different measurement models and consequently to algorithms having different computational complexities and posterior distributions having different shapes.

First, the relative parameterization framework will be discussed.

An odometry measurement, which will be denoted $Z_{n(n+1)} \in G$, is a noisy transformation between two consecutive local coordinate systems. A loop closure measurement, which will be denoted $Z_{mn} \in G$ where $n \neq m+1$, is a noisy transformation between two temporally nonconsecutive local coordinate systems. Moreover, in this embodiment, it is assumed the noises on the measurements are mutually independent.

The relative parameterization consists in estimating transformations of the form $T_{(k-1)k}$ where k is the local coordinate system of the camera at time instant k. Thus, at time instant k, the set of estimated transformations is $\Box \{T_{i(i+1)}\}_{i=1,\ldots,k-1}$. The absolute transformation $T_{1k}$ can be obtained simply by composing the estimated relative transformations i.e. $T_{1k}=T_{12}T_{23} \ldots T_{(k-)k}=\Pi_{i=1}^{K-1}T_{i(i+1)}$. The likelihood for an odometry measurement and a loop closure are assumed to be Gaussian and are given in Table 1 eq. (2) and eq. (3), respectively.

TABLE 1

Odometry measurement model and loop closure measurement model using a relative parametrization of the absolute transformations

| Odometry likelihood | Loop closure likelihood |
|---|---|
| p $(Z_{n(n+1)}\|T_{n(n+1)}) =$ $\mathcal{N}_G(Z_{n(n+1)}; T_{n(n+1)}, \Sigma_{n(n+1)})$ (2) | p $(Z_{mn}\|\{T_{i(i+1)}\}_{i=m,\ldots,n-1}) =$ $\mathcal{N}_G(Z_{mn}; \Pi_{i=m}^{n-1}T_{i(i+1)}, \Sigma_{mn})$ (3) |

Returning the simplified problem of a single loop, using relative parameterisation, the situation of FIG. 2(a) will be considered. Here, a loop of length $N_L$ is considered where there are $N_{L-1}$ odometry measurements $\{Z_{i(i+1)}\}_{i=1,\ldots,NL-1}$ available and a single loop closure $Z_{1NL}$ between the local coordinate systems 1 and $N_L$.

Using the likelihoods defined in eq. (2) and eq. (3), the following criterion is minimised w.r.t the relative transformations $\{T_{i(i+1)}\}_{i=1,\ldots,N_L-1}$.

$$-2\ln(p(\{T_{i(i+1)}\}_{i=1,\ldots,N_L-1}|Z_{1N_L}, \{Z_{i(i+1)}\}_{i=1,\ldots,N_L-1})) = \quad (4)$$

$$\left\|\log^{\vee}_G\left(Z_{1N_L}\left(\prod_{i=1}^{N_L-1}T_{i(i+1)}\right)^{-1}\right)\right\|^2_{\Sigma_{1N_L}} +$$

-continued $$\sum_{i=1}^{N_L-1} \|\log_G^\vee(Z_{i(i+1)}T_{i(i+1)}^{-1})\|_{\Sigma_{i(i+1)}}^2 + cst$$

According to an embodiment, one way to minimize this criterion is to apply a Gauss-Newton algorithm where the relative transformations are jointly refined iteratively as follows (the superscript stands for the iteration):

$$T_{i(i+1)}^{(l)} = \exp_G^\wedge(\delta_{i(i+1)}^{(l/l-1)}) T_{i(i+1)}^{(l-1)} \text{ for } i=1 \ldots N_L-1. \quad (5)$$

The increments $\{\delta_{i(i+1)}^{(l/l-1)}\}_{i=1 \ldots N_L-1}$ are obtained at each iteration by solving the following (dense) linear system of size p×NL:

$$\begin{bmatrix} \delta_{12}^{(l/l-1)} \\ \vdots \\ \delta_{(N_L-1)N_L}^{(l/l-1)} \end{bmatrix} = -\left((J_{rel}^{(l)})^T \Lambda J_{rel}^{(l)}\right)^{-1} (J_{rel}^{(l)})^T \Lambda \begin{bmatrix} -r_{12}^{(l-1)} \\ \vdots \\ -r_{(N_L-1)N_L}^{(l-1)} \\ r_{1N_L}^{(l-1)} \end{bmatrix} \quad (6)$$

where $J_{rel}^{(l)}$ is the Jacobian matrix of the system (see FIG. 3b), Λ is a block diagonal matrix concatenating the inverse of the covariance matrices of the measurements, $$r_{1N_L}^{(l-1)} = \log_G^\vee\left(Z_{1N_L}\left(\prod_{i=1}^{N_L-1} T_{i(i+1)}^{(l-1)}\right)^{-1}\right) \text{ and}$$

$$r_{i(i+1)}^{(l-1)} = \log_G^\vee(Z_{i(i+1)}(T_{i(i+1)}^{(l-1)})^{-1}).$$

The above relative parameterization requires to solve a dense linear system. However, by using the Woodbury formula and exploiting the structure of the problem, it is possible to show that:

$$\begin{bmatrix} \delta_{12}^{(l/l-1)} \\ \vdots \\ \delta_{(N_L-1)N_L}^{(l/l-1)} \end{bmatrix} = \begin{bmatrix} \Sigma_{12} & & 0 \\ & \ddots & \\ 0 & & \Sigma_{(N_L-1)N_L} \end{bmatrix} \quad (7)$$

$$(J_{LC}^{(l)})^T \left(\Sigma_{1N_L} + \sum_{i=1}^{N_L-1} J_{1i}^{(l)} \Sigma_{i(i+1)} (J_{1i}^{(l)})^T\right)^{-1} \cdot$$

$$\left(r_{1N_L}^{(l-1)} + J_{LC}^{(l)} \sum_{n=1}^{l-1} \begin{bmatrix} \delta_{12}^{(n/n-1)} \\ \vdots \\ \delta_{(N_L-1)N_L}^{(n/n-1)} \end{bmatrix}\right) - \sum_{n=1}^{l-1} \begin{bmatrix} \delta_{12}^{(n/n-1)} \\ \vdots \\ \delta_{(N_L-1)N_L}^{(n/n-1)} \end{bmatrix}$$

Where $J_{LC}^{(l)} = [J_{11}^{(l)} \ldots J_{1(N_L-1)}^{(l)}]$ is the Jacobian of the loop closure error and $J_{1n}^{(l)} \simeq Ad_G(\Pi_{i=1}^{n-1} T_{i(i+1)}^{(l-1)})$. In this case, only a linear system of size p (i.e. independent of the length of the loop) has to be solved, making the algorithm highly efficient to close a single loop (in practice, p=6 for G=SE(3), p=8 for G=SL(3), etc.). Moreover, the inverse of the pseudo-Hessian $(J_{rel}^T \Lambda J_{rel})^{-1}$ which represents (once the algorithm has reached convergence) the covariance matrix of the posterior distribution under a linear approximation, exhibits very small correlations between the transformations. Therefore, a block diagonal approximation of that covariance matrix is a reasonable approximation that would allow a filter to be derived that can deal efficiently with large scale problems.

Comparing the above with an absolute parameterisation, the absolute parameterization consists of estimating transformations of the form $T_{kW}$ where W is the "world" coordinate system and k is the local coordinate system of the camera at time instant k. Thus at time instant k, the set of estimated transformations $\{T_{iW}\}_{i=1 \ldots k}$ In practice, $T_{1W}$ is usually fixed to the identity matrix since the "world" coordinate system is also unknown. The likelihood for an odometry measurement and a loop closure are assumed to be Gaussian and are given in Table A1 eq. (A1) and eq. (A2), respectively.

TABLE A1

| Odometry likelihood | | Loop closure likelihood | |
|---|---|---|---|
| $p(Z_{n(n+1)}|T_{nW}, T_{(n+1)W}) =$ | A1 | $p(Z_{mn}|T_{mW}, T_{nW}) =$ | A2 |
| $N_G(Z_{n(n+1)}; T_{nW}T_{(n+1)W}^{-1}, \Sigma_{n(n+1)})$ | | $N_G(Z_{mn}; T_{mW}T_{nW}^{-1}, \Sigma_{mn})$ | |

Analogous to the relative parameterisation case, the likelihoods defined in eq. (A1) and eq. (A2), we are minimized using the following criterion, but this time w.r.t the absolute transformations $\{T_{iW}\}_{i=1 \ldots N_L}$:

$$-\ln\left(p(\{T_{iW}\}_{i=1,\ldots,N_L} | Z_{1N_L}, \{Z_{i(i+1)}\}_{i=1,\ldots,N_L-1})\right) = \quad (A3)$$

$$\frac{1}{2}\|\log_G^\vee(Z_{1N_L}T_{N_LW}T_{1W}^{-1})\|_{\Sigma_{1N_L}}^2 +$$

$$\frac{1}{2}\sum_{i=1}^{N_L-1}\|\log_G^\vee(Z_{i(i+1)}T_{(i+1)W}T_{iW}^{-1})\|_{\Sigma_{i(i+1)}}^2 + cst$$

Again as for relative parameterisation, the criterion is minimised by applying a Gauss-Newton algorithm where the absolute transformations are jointly refined iteratively as follows
(the superscript stands for the iteration):

$$T_{iW}^{(l)} = \exp_G^\wedge(\delta_{iW}^{(l/l-1)}) T_{iW}^{(l-1)} \text{ for } i=1 \ldots N_L. \quad (A4)$$

The increments $\{\delta_{iW}^{(l/l-1)}\}_{i=1 \ldots N_L}$ are obtained at each iteration by solving the following (sparse) linear system of size p×$N_L$:

$$\begin{bmatrix} \delta_{1W}^{(l/l-1)} \\ \vdots \\ \delta_{N_LW}^{(l/l-1)} \end{bmatrix} = -\left((J_{abs}^{(l)})^T \Lambda J_{abs}^{(l)}\right)^\dagger (J_{abs}^{(l)})^T \Lambda \begin{bmatrix} -r_{12}^{(l-1)} \\ \vdots \\ -r_{(N_L-1)N_L}^{(l-1)} \\ r_{1N_L}^{(l-1)} \end{bmatrix} \quad (A5)$$

Where $J_{abs}^{(l)}$ is the Jacobian of the system, Λ is a block diagonal matrix concatenating the inverse of the covariance matrices of the measurements and † stands for the pseudo-inverse of a matrix (since $(J_{abs}^{(l)})^T \Lambda J_{abs}^{(l)}$ has p null eigenvalues). Moreover $r_{1N_L}^{(l-1)} = \log_G^\vee(Z_{1N_L}T_{N_LW}^{(l-1)}(T_{1W}^{(l-1)})^{-1})$ and $r_{i(i+1)}^{(l-1)} = \log_G^\vee(Z_{i(i+1)}T_{(i+1)W}^{(l-1)}(T_{iW}^{(l-1)})^{-1})$.

A comparison between the relative parameterisation approach and the absolute parameterisation can be seen in FIGS. 3(a) to 3(f).

FIGS. 3(a) to 3(f) shows representations from a motion averaging problem on the SE(3) group for a single loop. FIG. 3(a) is a representations of the Jacobian matrix for absolute parameterisation, FIG. 3(b) is a is a representations of the pseudo-Hessian matrix for absolute parameterisation, FIG. 3(c) is a representations of the inverse pseudo-Hessian matrix for absolute parameterisation, FIG. 3(d) is a representations of the Jacobian matrix for relative parameterisation, FIG. 3(e) is a is a representations of the pseudo-Hessian matrix for relative parameterisation and FIG. 3(f) is a representations of the inverse pseudo-Hessian matrix for relative parameterisation.

Using an absolute parameterization, the inverse pseudo-Hessian (FIG. 3(b)) exhibits very strong correlations between the absolute transformations. On the contrary, using a relative parameterization as shown in FIG. 3(e), the inverse pseudo-Hessian has very small correlations (not null but close to zero) between the relative transformations, this justifies the choice of the use of a variational Bayesian approximation of the posterior distribution which assumes independent relative transformations.

From the above, relative parameterization provides a more attractive platform than absolute parameterization, at least for online inference. Thus, for methods in accordance with an embodiment of the present invention, a relative parameterization is used for the design of the filter.

As will be explained with reference to FIGS. 4 to 6(b), loop closure measurements will be processed sequentially using this highly efficient GN which only requires solving a linear system of size p at each iteration. After having processed a loop closure, the covariance matrix of the posterior distribution will be approximated with a block diagonal covariance matrix using a variational Bayesian approximation.

In an embodiment, this approach employs a GN algorithm, which is optimal for any problem (i.e. any matrix Lie group G with anisotropic noises on the measurements) containing loops that do not interact with each other.

FIG. 4 is a flow diagram of the steps of a method used for online variation Bayesian motion averaging.

At time instant k−1 (where k>2), the estimated state consists in all the relative transformations $\chi_{k-1} = \{T_{i(i+1)}\}_{i=1 \ldots k-2}$ More specifically, at time instant k−1, the posterior distribution of the state is assumed to have the following factorized form:

$$p(\chi_{k-1} | \mathcal{D}_{odo,k-1}, \mathcal{D}_{LC,k-1}) = \qquad (8)$$

$$Q_{k-1}(\chi_{k-1}) = \prod_{i=1}^{k-2} \mathcal{N}_G(T_{i(i+1)}; \overline{T}_{i(i+1)}, P_{i(i+1)})$$

where $\mathcal{D}_{odo,k-1} = \{Z_{i(i+1)}\}_{i=1,\ldots,k-2}$ and $\mathcal{D}_{LC,k-1} = \{Z_{ij}\}_{1 \leq i < j-1 < k-1}$.

At time instant k, when the new odometry measurement $Z_{(k-1)k}$ (with known covariance $\Sigma_{(k-1)k}$) is available at step S151, the estimated state simply augments, i.e. $\chi_k = \{T_{i(i+1)}\}_{i=1 \ldots k-1}$. Consequently, the posterior distribution of the state remains factorized and has the following form:

$$p(\chi_k | \mathcal{D}_{odo,k}, \mathcal{D}_{LC,k-1}) = Q_k^{odo}(\chi_k) = \prod_{i=1}^{k-1} \mathcal{N}_G(T_{i(i+1)}; \overline{T}_{i(i+1)}, P_{i(i+1)}) \qquad (9)$$

where $\mathcal{D}_{odo,k} = \{Z_{i(i+1)}\}_{i=1,\ldots,k-1}$, $\overline{T}_{(k-1)k} = Z_{(k-1)k}$ and $P_{(k-1)k} = \Sigma_{(k-1)k}$.

At time instant k, after having received the odometry measurement $Z_{(k-1)k}$, the process moves to step S153 where it is determined if a new loop closure measurement is available. If no loop closure measurement is available, then the process loops back to step S151. However, if a loop closure measurement is available, then the process moves to step S155. How it is determined whether or not a loop closure measurement is available will be described with reference to step S201 of FIG. 5.

In step S155 the new loop closure measurement $Z_{lk}$ (with known covariance $\Sigma_{lk}$) (where l<k) is processed. In fact, multiple loop closures may be available. However, for this explanation, in order to keep the notations uncluttered, only one loop closure will be described.

In practice, the processing is applied sequentially to each loop closure as will be described with reference to FIG. 5.

When a new loop closure measurement $Z_{lk}$ is available, the information coming from that observation is used to refine the current estimate of the state. However, the observation model eq. (3) creates dependencies between all the relative transformations involved in the loop, and, therefore, the posterior distribution is not factorized anymore. Thus, the number of parameters required to exactly describe that non-factorized posterior distribution becomes huge (typically in $O(k^2)$ or greater), especially for large scale problems.

In an embodiment, the above posterior distribution is approximated by a factorized distribution, to allow the system to operate online on large scale problems. In an embodiment, the number of parameters of the distribution will be in $O(k)$. Such an approximation is justified by the single loop analysis discussed with reference to FIGS. 2 and 3.

In an embodiment, one way to find a factorized distribution "similar" to the true posterior distribution is to minimize the Kullback-Leibler divergence $$D_{KL}(Q_{VB}(\chi_k) \| p(\chi_k | \mathcal{D}_{odo,k}, \mathcal{D}_{LC,k-1}, Z_{lk})) \text{ with} \qquad (10)$$

$$Q_{VB}(\chi_k) = \prod_{i=1}^{k-1} q_{VB}(T_{i(i+1)}).$$

In the above approach which is termed called "variational Bayesian approximation" or "Structured Mean Field" a fully factorized distribution is not assumed, instead the relative transformations are assumed to be mutually independent.

Following on from the above, Minimizing the KL divergence in (10) w.r.t $\chi_k$ corresponds to maximizing the lower bound $$\mathcal{L}(Q_{VB}(\chi_k)) = \int Q_{VB}(\chi_k) \ln\left(\frac{p(\chi_k, \mathcal{D}_{odo,k}, \mathcal{D}_{LC,k-1}, Z_{lk})}{Q_{VB}(\chi_k)}\right) d\chi_k. \qquad (11)$$

Here, the (log)-joint distribution of all the random variables has the form:

$$\ln(p(\chi_k, \mathcal{D}_{odo,k}, \mathcal{D}_{LC,k-1}, Z_{lk})) = \qquad (12)$$

$$\ln\left(p\left(Z_{lk} | \{T_{i(i+1)}\}_{i=l,\ldots,k-1}\right) Q_k^{odo}(\chi_k)\right) =$$

$$-\frac{1}{2}\left\|\log_G^{\vee}\left(Z_{lk}\left(\prod_{i=l}^{k-1} T_{i(i+1)}\right)^{-1}\right)\right\|_{\Sigma_{lk}}^2 -$$

$$\frac{1}{2}\sum_{i=1}^{k-1}\left\|\log_G^{\vee}\left(T_{i(i+1)}\overline{T}_{i(i+1)}^{-1}\right)\right\|_{P_{i(i+1)}}^2 + cst$$

However, because of the curvature of the Lie group, the terms inside the norms in (12) are not linear in the transformations. One way to apply a variational Bayesian approach in this case is to linearize the terms inside the norms.

At this point, it is convenient to define the variables involved in the linearization step:

$$T_{i(i+1)} = \exp_G{}^{\wedge}(\epsilon_{i(i+1)})\check{T}_{i(i+1)} \text{ for } i=1\ldots k-1 \quad (13)$$

where $\check{T}_{i(i+1)}$ is the (fixed) linearization point for the relative transformation $T_{i(i+1)}$ and $\epsilon_{i(i+1)}$ is a random variable. This linearization point is quite important and its value is discussed at the end of the section. After linearization, the log-joint distribution becomes:

$$\ln\left(p(\{\epsilon_{i(i+1)}\}_{i=1,\ldots,k-1}, \mathcal{D}_{odo,k}, \mathcal{D}_{LC,k-1}, Z_{lk})\right) = \quad (14)$$

$$-\frac{1}{2}\left\|r_{lk} - \sum_{i=l}^{k-1} J_{li}\epsilon_{i(i+1)}\right\|_{\Sigma_{lk}}^2 - \frac{1}{2}\sum_{i=1}^{k-1}\|r_{i(i+1)} + \epsilon_{i(i+1)}\|_{P_{i(i+1)}}^2 + cst$$

Where the Jacobian of $\log_G{}^{\vee}$ approximated by the identity:

$$J_{li} = Ad_G(\Pi_{j=l}^{i-1}\check{T}_{j(j+1)}) \text{ for } i>l, J_{ll}=Id, r_{lk}=\log_G{}^{\vee}(Z_{lk}(\Pi_{i=l}^{k-1}\check{T}_{i(i+1)})^{-1})$$

and $$r_{i(i+1)} = \log_G{}^{\vee}(\check{T}_{i(i+1)}\bar{T}_{i(i+1)}{}^{-1})).$$

Given the log-joint distribution (14), the objective is now to maximize the lower bound (11) where $\chi_k$ is now replaced with $\{\epsilon_{i(i+1)}\}_{i=1,\ldots,k-1}$ because of the linearization step. Here:

$$Q_{VB}(\{\epsilon_{i(i+1)}\}_{i=1,\ldots,k-1}) = \prod_{i=1}^{k-1} q_{VB}(\epsilon_{i(i+1)}). \quad (15)$$

In fact, it is possible to show that for each variable $\epsilon_{i(i+1)}$, the best approximated distribution is given by the following expression:

$$\ln(q_{VB}^*(\epsilon_{i(i+1)})) = \mathbb{E}_{Q_{VB}\setminus q_{VB}^*(\epsilon_{i(i+1)})}[\ln(p(\{\epsilon_{i(i+1)}\}_{i=1,\ldots,k-1}, \mathcal{D}_{odo,k}, \mathcal{D}_{LC,k-1}, Z_{lk}))] + cst \quad (16)$$

Where $\mathbb{E}_{Q_{VB}\setminus q_{VB}^*(\epsilon_{i(i+1)})}$ stands for the conditional expectation w.r.t all the variables except $\epsilon_{i(i+1)}$. Thus, the following is obtained:

$$\ln(q_{VB}^*(\epsilon_{i(i+1)})) = -\frac{1}{2}(\epsilon_{i(i+1)} - \mu_{i(i+1)})^T \Xi_{i(i+1)}^{-1}(\epsilon_{i(i+1)} - \mu_{i(i+1)}) + cst \quad (17)$$

where $\Xi_{i(i+1)} = (J_{li}^T \Sigma_{lk}^{-1} J_{li} + P_{i(i+1)}^{-1})^{-1} \quad (18)$ and $\mu_{i(i+1)} = \Xi_{i(i+1)}^{-1}(J_{li}^T \Sigma_{lk}^{-1} e_{lk,i} - P_{i(i+1)}^{-1} r_{i(i+1)}) \quad (19)$ With $e_{lk,i} = r_{lk} - (\sum_{j=l, j\neq i}^{k-1} J_{lj}\mu_{j(j+1)})$. Therefore, for each random variable $\epsilon_{i(i+1)}$ ($i=1\ldots k-1$) the best approximated distribution is a Gaussian of the form:

$$q_{VB}^*(\epsilon_{i(i+1)}) = \mathcal{N}_{\mathbb{R}^p}(\epsilon_{i(i+1)}; \mu_{i(i+1)}, \Xi_{i(i+1)})$$
$$\text{for } i=1,\ldots,k-1 \quad (20)$$

If $i<l$, i.e if the relative transformation $T_{i(i+1)}$ is not involved in the loop closure $Z_{lk}$, then $$q_{VB}^*(\epsilon_{i(i+1)}) = \mathcal{N}_{\mathbb{R}^p}(\epsilon_{i(i+1)}; 0, \Xi_{i(i+1)} = P_{i(i+1)}) \text{ for } i<l \quad (21)$$

making the algorithm very efficient since a loop closure will only modify the relative transformations involved in that loop. In theory, in order to obtain the values of $\{\mu_{i(i+1)}\}$ $i=1\ldots k-1$, eqn (19) could be cycled through for each relative transformation involved in the loop until convergence. However, it is possible to show that if the linearization step (see eq. (13)) is performed around the minimizer of (12), then $\mu_{i(i+1)} = 0$ for $i=1,\ldots,k-1$.

Thus, in practice, for each new loop closure measurement, the Gauss-Newton algorithm is applied in order to find the minimizer of (12) very efficiently in step S203. Then only the covariances $\Xi_{i(i+1)}$ (see eq. (18)) need to be computed for $i=1,\ldots,k-1$ in step S205.

Finally, for each relative transformation, $q_{VB}^*(\epsilon_{i(i+1)})$ is a Gaussian with zero mean. Therefore, from eq. (13), one can see that (up to a linear approximation) $q_{VB}^*(T_{i(i+1)})$ is a Gaussian distribution on Lie group (see eq. (1)) of the form $\mathcal{N}_G(T_{i(i+1)}; \check{T}_{i(i+1)}, \Xi_{i(i+1)})$. Consequently, after having processed a new loop closure, the factorised approximation of the posterior has the following form:

$$p(\mathcal{X}_k | \mathcal{D}_{odo,k}, \mathcal{D}_{LC,k-1}, Z_{lk}) \approx Q_{VB}(\mathcal{X}_k) = \quad (22)$$

$$\prod_{i=1}^{k-1} \mathcal{N}_G(T_{i(i+1)}; \check{T}_{i(i+1)}, \Xi_{i(i+1)})$$

This then allows updating of the absolute transformations as per step S207.

Figure 5:
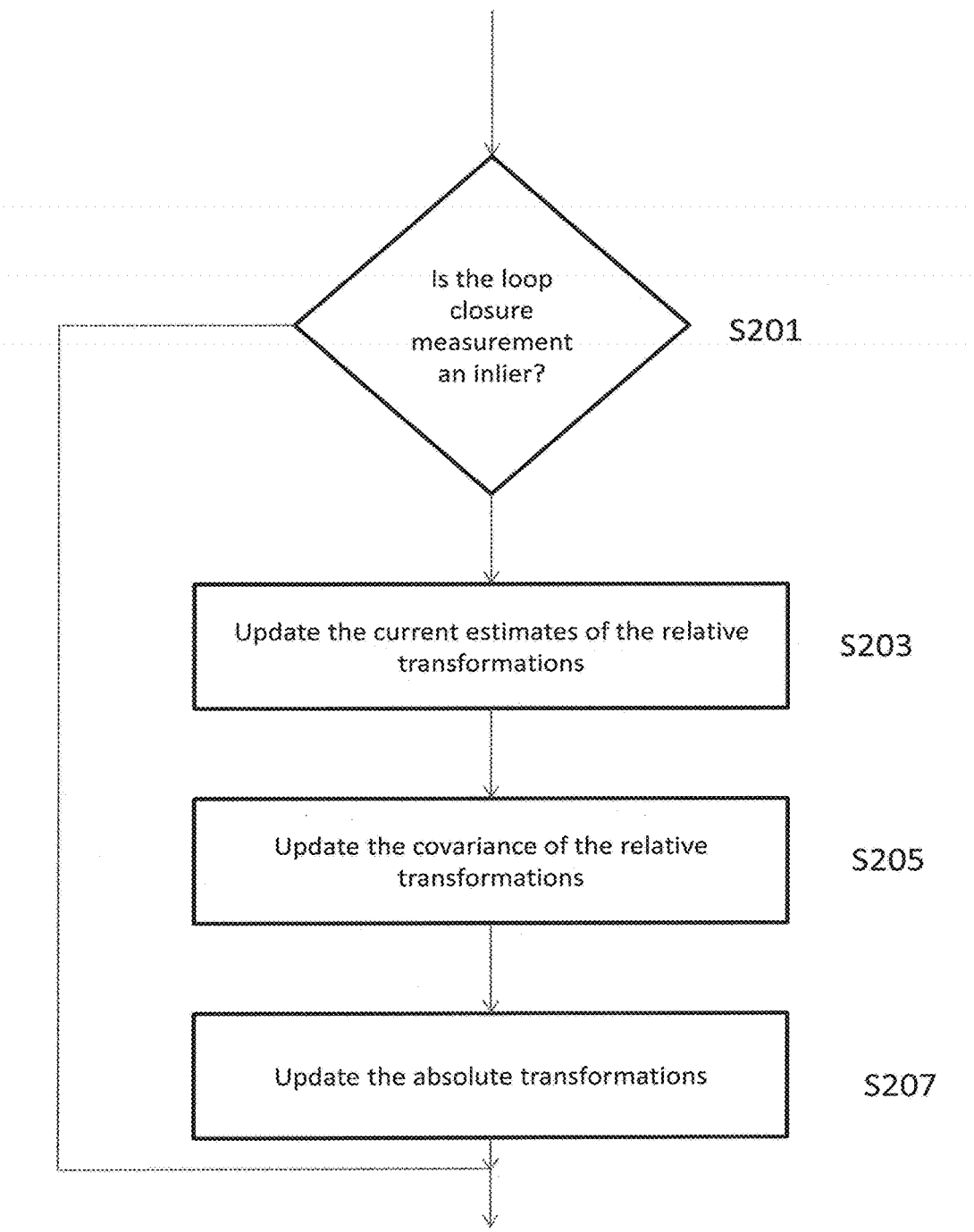
FIG. 5 is a flow chart showing a method in accordance with an embodiment of the invention showing the basic processing of a closed loop measurement.

In FIG. 5, S201 refers to a decision to determine whether a loop closure measurement is an inlier. In practice, two places being perceived as the same often produces a wrong loop closure. Consequently, in an embodiment, there is a step of detecting and removing these wrong loop closure measurements in order to perform motion averaging, especially for large scale problems where wrong loop closures are very likely to occur.

As the above method continuously maintains an approximation of the posterior distribution, it is possible to detect wrong loop closure measurements through validation gating. This approach consists in first computing the mean $\bar{Z}_{lk}$ and covariance $\Sigma_{lk}$ parameters of the following distribution:

$$p(Z_{lk} | \mathcal{D}_{odo,k}, \mathcal{D}_{LC,k-1}) \approx \quad (23)$$

$$\mathcal{N}_G\left(Z_{lk}; \bar{Z}_{lk} = \prod_{i=l}^{k-1} \check{T}_{i(i+1)}, \Sigma_{lk} = \Sigma_{lk} + \sum_{i=l}^{k-1} J_{li} P_{i(i+1)} J_{li}^T\right)$$

and then testing w.r.t a threshold t whether or not the received measurement is likely to be an inlier:

$$\|\log_G{}^{\vee}(Z_{lk}\bar{Z}_{lk}{}^{-1})\|_{\Sigma_{lk}}^2 < t \quad (24)$$

In theory, t should be based on the p-value of the Chi-squared distribution. However, as will be explained with reference to the examples, such a theoretical value is sometimes too restrictive, especially when processing real data where the covariance of the odometry and loop closure measurements are not very accurate and the assumption of mutually independent noise might be violated as the measurements are all defined from the same dataset. In practice, t can be selected by trial and error, for example by running the algorithm on a ground truth dataset. In one, non-limiting, example, t=900.

FIG. 6 is an example of pseudo-code for implementing the above method. This will be explained in detail here to show how in one embodiment, the above described steps can be implemented.

The system is provided with a stream of odometry measurements $\{Z_{(k-1)k}, \Sigma_{(k-1)k}\}_{k=2, \ldots}$ where Z is a measure of the similarity, $\Sigma$ is the covariance and k is the measurement and k is the local coordinate system of the camera at time instance k. The system is also provided with a stream of loop closure measurements $\{Z_{mn}, \Sigma_{mn}\}_{m<n}$ and the gating threshold t for determining the presence of inliers.

In step S301, the values for k and the mean absolute transform $\bar{T}_{1k}^{abs}$ are initialised to 1 and the identity matrix respectively. A new odometry measurement is then processed and k is incremented by 1 in step S302. Here, first, the mean $\bar{T}_{(k-1)k}$ and covariance $P_{(k-1)k}$ of the relative transform at time instance k are initialised to the values of the odometry measurement that is being processed in step S303.

The mean of the absolute transformation $\bar{T}_{1k}^{abs}$ is then set to the most recent estimate of the absolute transformation augmented with the odometry measurement to be processed in step S305.

Step 306 determines if there is a new loop closure measurement to process. If there is a new loop closure measurement to process then at step S307, it is determined if this measurement is an inlier in accordance with the method discussed in relation to Eqn 24 above. The threshold t is received as an input. If the loop closure measurement is an outlier (i.e. the condition is not satisfied) then the next odometry measurement is processed in step S303.

Figure 6A:
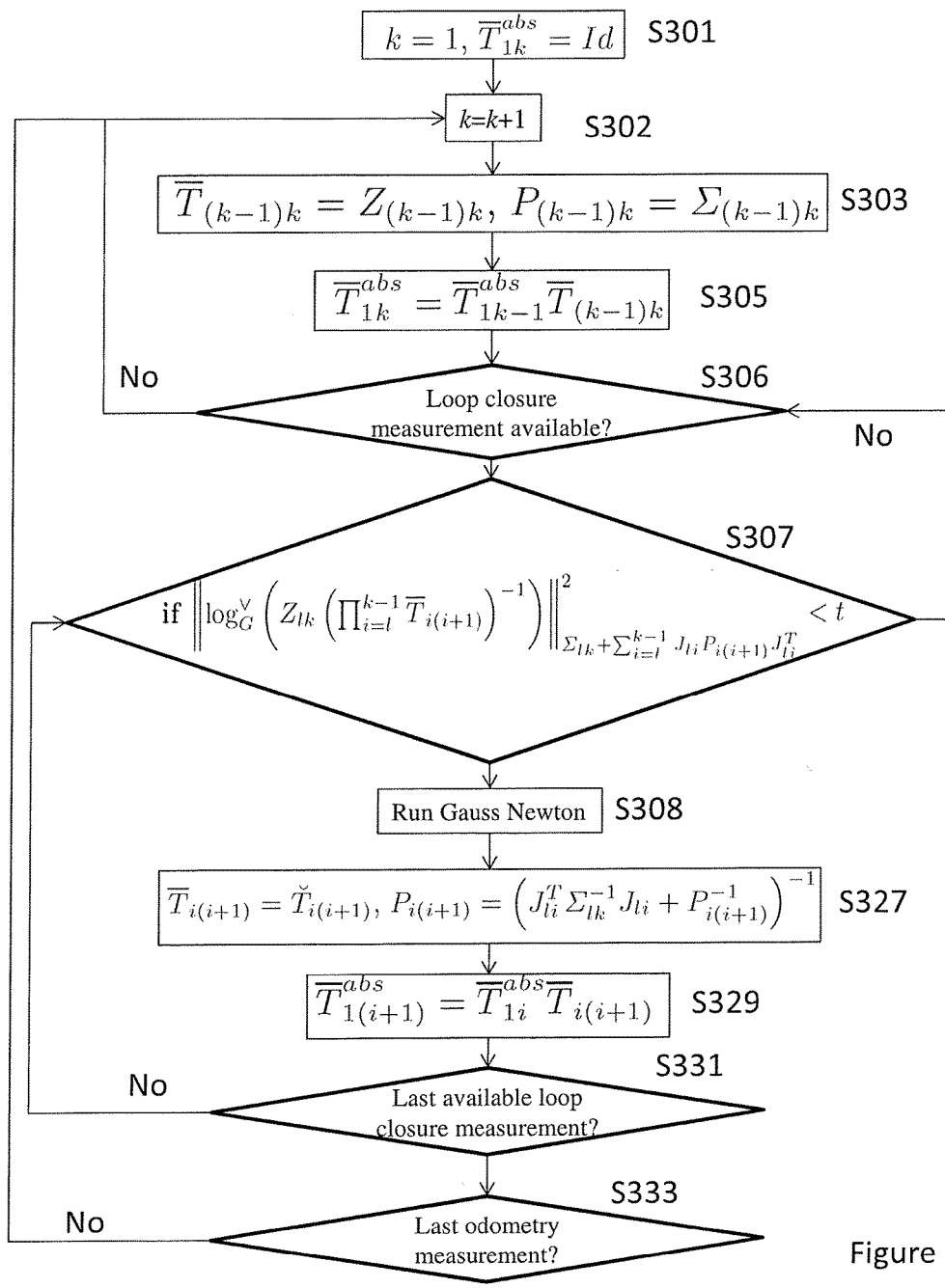
FIG. 6(a) is a flow diagram showing the order of the processing steps performed by a processor implementing a method in accordance with an embodiment of the present invention.
Figure 6B:
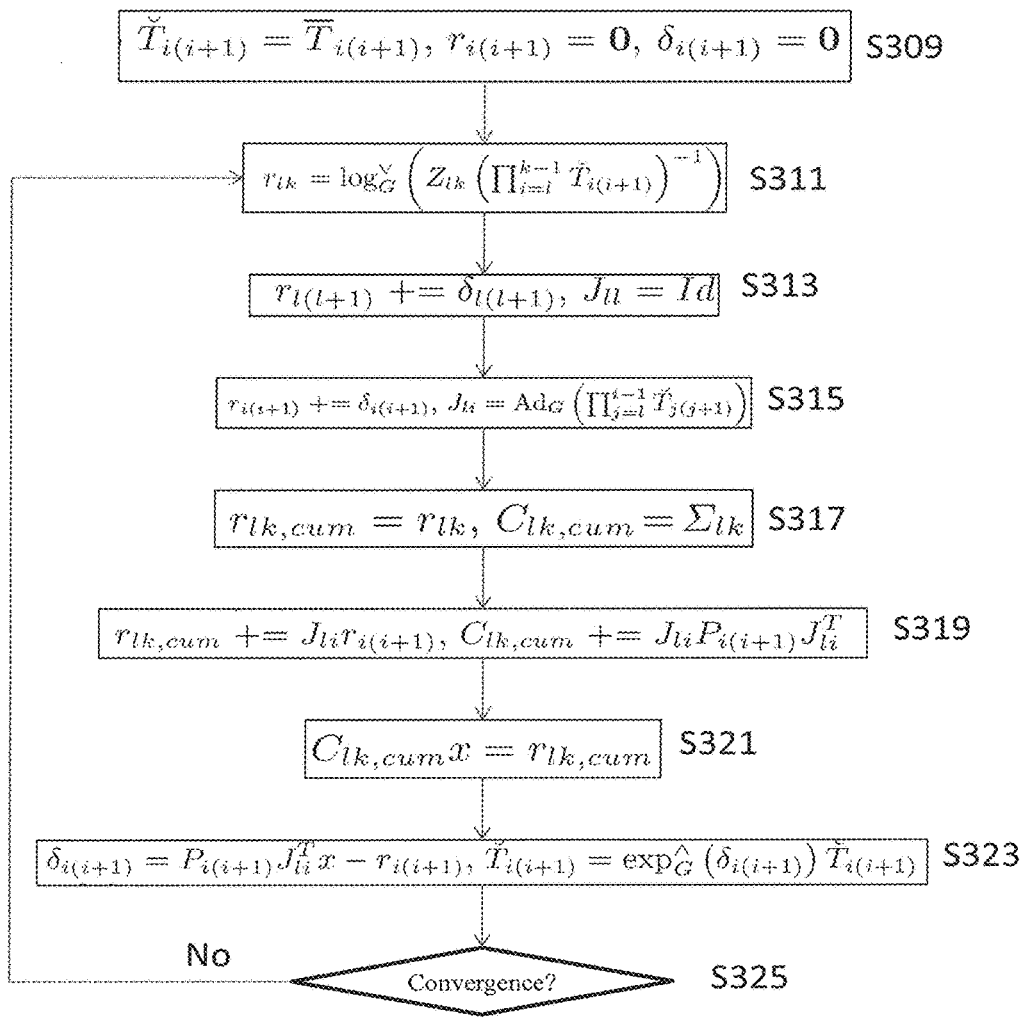
FIG. 6(b) is a flow diagram showing the Gauss Newton process of FIG. 6(a) in more detail.

If it is determined that the next loop closure measurement is an inlier, then the Gauss Newton method is used to determine the minimizer of Eqn (12) above and then the linearization step is performed. To achieve this, the Gauss Newton (GN) method is implemented via steps S309 to S319. On FIG. 6a, the GN method is shown as step S308. The full GN method is shown in FIG. 6b.

In step S309, for each measurement i in the loop from the start of the loop 1 to k−1, the (fixed) linearization point $\check{T}_{i(i+1)}$ for each relative transformation $T_i(i+1)$ is set at the current estimate for each relative transformation, i.e. $T_{i(i+1)}$ and each relative error $r_i(i+1)$ and increment $\delta_i(i+1)$ are both set to zero in step S309.

Until the Gauss Newton method converges, the loop error is calculated in step S311. Next, in step S313, the relative error for l is set to the increment and the Jacobian $J_{ll}$ is set to the identity matrix. Then for all of the remaining measurements in the loop (l+1 to k−1), the relative errors and the Jacobians ($J_{li}$) are updated in step S315. Convergence can be determined by a number of methods, for example, by using a fixed number of iterations or by monitoring at least one of the increments, errors or parameters to see if they are stable between iterations. In an embodiment, stability is determined by comparing the increments, changes in errors or parameters with a minimal fixed value for example <$10^{-6}$.

The cumulated error rlk,cum and the cumulative covariance Clk,cum are then initialised to the values of the loop error rlk and the covariance of the loop closure measurement in step S317. In step S319, the cumulative error and the covariance are then calculated from the Jacobians determined for each of the measurements in the loop.

In step S321 x is obtained by solving Clk,cum x=rlk,cum and x is used in step S323

In step S323, for each measurement in the loop, the increment is updated and the relative transformations (linearization point) $\check{T}_{i(+1)}$ are updated.

If the GN has not converged at step S325, then the Gauss Newton process repeats from step S311. When the GN converges, the variational Bayesian approximation of the posterior distribution is generated and the covariance for each relative transformation in the loop is calculated in S327. Here also the relative transformation for each measurement is set at the linearization point. Finally, the absolute transformations are determined in step S329.

At step S331, it is determined if there is another available loop closure measurement. As noted above, more than one loop closure measurement can be available for each new odometry measurement. If there is more than one loop closure measurement, then the Gauss Newton process S308 is repeated.

In step S333, it is determined if a new odometry measurement is available, if it is, then the process repeats again from step S303. The above method continually outputs the updated absolute transforms.

As can be seen from the above method, the system can operate on-line as the absolute transformations are updated as each new measurement is received. Looking at the GN method, each new loop closure measurement is used to refine existing estimates of the relative transformations.

The variational Bayes (VB) approach approximates the posterior distribution with a factorised distribution where the number of parameters are O(k). In this embodiment, the VB is implemented by minimising the KL divergence as shown above in equations 11 and 12. The means of the relative transformations if derived via a linearization step are zero when performed around the minimiser of equation 12 and thus there is a very efficient method of deriving the means of the relative transformations by performing the GN method to minimise equation 12 above. Due to the zero means in the above framework and the known Lie group properties, the distribution can be expressed as shown in equation 22. The detailed flow chart explained with reference to FIGS. 6(a) and 6(b) shows one way of implementing this method.

In the above described method, the parameters of the estimated distributions are the means and the covariance of the relative transformations. The above method models the total covariance as a block diagonal matrix where the number of blocks on the diagonal is the number of relative transformations in the loop which is being re-estimated due to a loop closure measurement. No other relative transformations are updated except for those in the loop closure being processed.

The size of the blocks is set by the size of the covariance from the original odometry measurements received in step S301. The size of the covariance of the original measurements it set by the type of measurement. Typically, the size of the block will correspond to the number of degrees of freedom. For example, camera pose will have 6 degrees of freedom and the covariance can be represented by a 6×6 matrix, although it is possible to further compress the size of the matrix, a homography measurement has 8 degrees of freedom and again the size of the matrix can be reduced.

Thus, the number of parameters that need to be re-estimated at any point scales with the number of relative transforms within loop closure measurement, this allows the system to operate and process measurements in real time as opposed to only via an off-line batch operation.

Figure 6C:
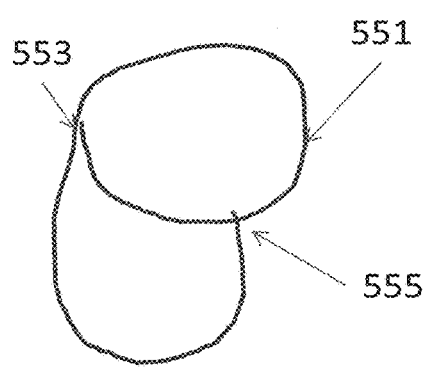
FIG. 6(c) is a schematic plot of a path with two loop closure measurements occurring at different times.
Figure 6D:
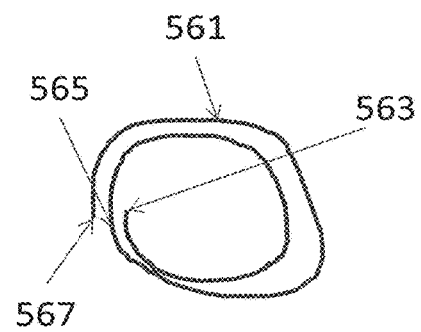
FIG. 6(d) is a schematic plot of a path with two loop closure measurements occurring at the same time.

For completeness, FIGS. 6(c) and 6(d) are used to show the situation where there are multiple loop closures. In FIG. 6(c), the path, 551 forms a first loop closure at point 553. A second loop closure is then provided at point 555. The first loop closure measurement is used to correct the relative transformations from 553 back to point 553. The second loop closure 555 is then used to correct the relative transformations from point 555 back to point 555. It should be noted that the measurements from point 553 to point 555 are not used or updated when the second loop closure measurement is computed as these measurements do not form part of the same loop.

In FIG. 6(d), the path 561 loops back on itself twice. Therefore, there is a first loop closure measurement between the points 563 and 565 on the estimated path and a second loop closure measurement between points 567 and 563. The algorithm handles such a situation by sequentially processing each of the loop closure measurements.

In an example, the method was applied to a binocular 6D SLAM application (Lie group SE(3)). For this, the method was applied to one synthetic data sequence (Sphere) and two real sequences (originally from the KITTI dataset which is available from the Karlsruhe Institute of Technology. The KITTI dataset provides raw data and the odometry and loop closure measurements are derived from this. The results for this experiment are given in Table 2. Table 2 shows both the Root Mean Squared Error (RMSE) for the absolute positions as well as the computational time taken in both C++ and Matlab.

TABLE 2

| RMSE position - (m) | | | Time (ms): C++ | | | Time (ms): Matlab | | |
|---|---|---|---|---|---|---|---|---|
| Sphere | KITTI 00 | KITTI 02 | Sphere | KITTI 00 | KITTI 02 | Sphere | KITTI 00 | KITTI 02 |
| 2.1 | 2.7 | 13.6 | 971 | 65 | 29 | 136000 | 8000 | 4000 |

It should be noted that the methods in accordance with embodiments of the present invention summarize the previous data with a small number of parameters as opposed to storing all past measurements. This makes the method both fast and accurate.

Figures 7A, 7B:
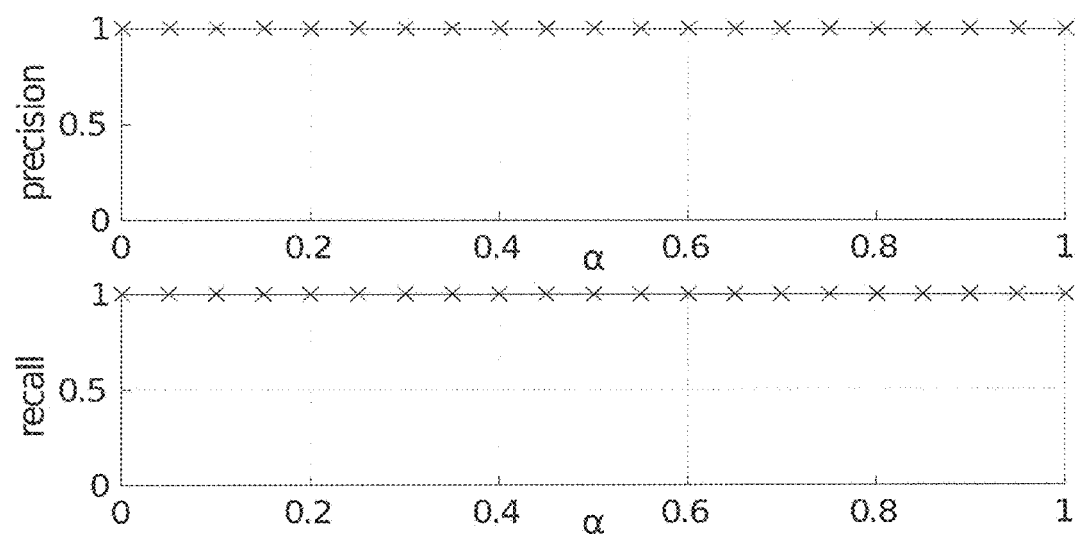
FIG. 7(a) shows results for the precision of the method applied to a planar visual SLAM (SE(2)) task on the KITTI 00 dataset.
FIG. 7(b) shows results for the recall of the method applied to a planar visual SLAM (SE(2)) task on the KITTI 00 dataset.

FIGS. 7(a) to 7(d) show results from planar visual SLAM measurements on the (SE(2)) group derived from the KITTI 00 and KITTI 07 datasets. Both a visual odometry module and a loop closure module were used to produce the odometry and loop closure measurements for processing. To test the robustness of the algorithm, the loop closure module that was used has a threshold that allows the output to be tuned using a parameter α. If α=1 only highly confident loop closures were outputted if α=0, then all the loop closures were outputted from the loop closure module. Synthetic wrong loop closures are also generated and added to the set of loop closure measurements. In order to evaluate the robustness of an algorithm, the experiment consists, for different values of a in applying the algorithm and computing the loop closure detection precision and recall. Here, precision is defined as the number of true positives over the total number of true positives and false positives and recall is defined as the number of true positives over the number of true positives and false negatives. The results for this experiment are given in FIGS. 7(a) to 7(d). In FIGS. 7(a) and 7(b) data is given for the precision and recall respectively. The data is taken from the KITTI 00 dataset. It can be seen that both precision and recall have a perfect score of 1.

Figures 7C, 7D:
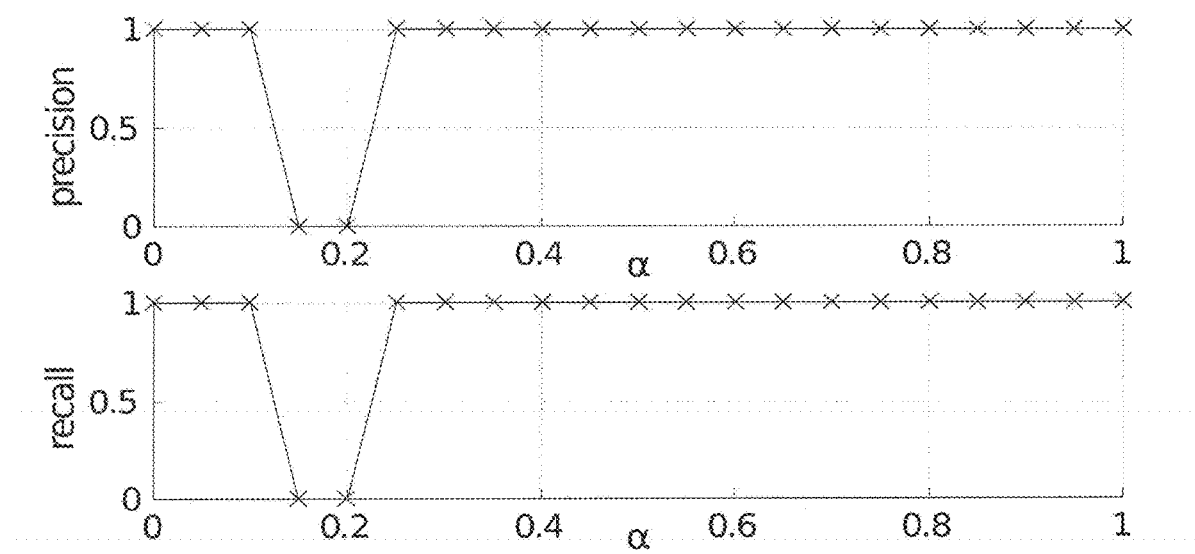
FIG. 7(c) shows results for the precision of the method applied to a planar visual SLAM (SE(2)) task on the KITTI 07 dataset.
FIG. 7(d) shows results for the recall of the method applied to a planar visual SLAM (SE(2)) task on the KITTI 07 dataset, in all cases the x axis is a measure of number of incorrect loop closure measurements to be processed by a method in accordance with an embodiment of the invention.

FIGS. 7(c) and 7(d) show data for precision and recall respectively. The data is taken from the KITTI 07 dataset. Here, it can be seen that the method fails for α=0.15 and 0.2. Here, both precision and recall drop to zero because of an ambiguous wrong loop closure was classified as inlier. This led to the distortion of the estimated trajectory and, as a consequence, to the rejection of all the subsequent loop closures.

Figure 8A:
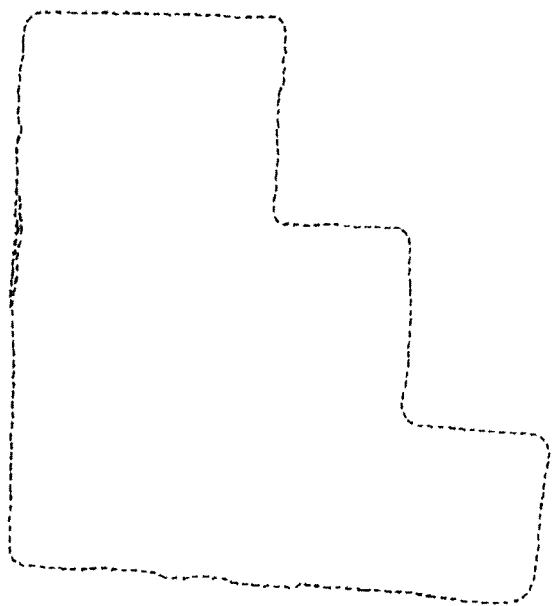
FIG. 8(a) is a plot of the representation of camera pose measured by LIDAR and FIG. 8(b) is a plot of the representation of camera pose determined by a method in accordance with an embodiment of the present invention.
Figure 8B:
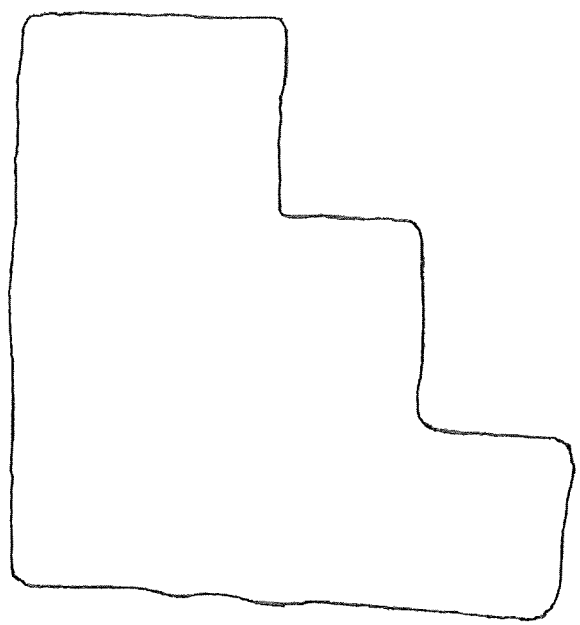

FIGS. 8(a) and 8(b) are used to demonstrate the ability of the above approach to deal with the Lie group Sim(3) by considering a monocular visual SLAM problem. In order to obtain the measurements, a local SLAM approach performs sliding-window bundle adjustment in order to reconstruct small overlapping submaps. Here a "submap" corresponds to a fragment of the camera trajectory and a small 3D point cloud. The odometry measurements are obtained by computing the 3D similarities between the temporally consecutive submaps. In order to detect a loop closure between the current submap and a previous submap, first a place recognition algorithm. is used. Then, for each candidate past submap, the descriptors of its 3D points with the 3D points of the current submap are matched. Finally, a 3D similarity is computed using a RANSAC algorithm.

The objective of a motion averaging algorithm in this application is to align all the submaps, resulting in a global map of the environment, i.e. a global 3D point cloud as well as the complete camera trajectory.

In FIG. 8(b), the results are presented from monocular visual SLAM (Lie group Sim(3)) on sequence 15 of the KITTI dataset. One can see that the trajectory estimated with the above approach is visually close to the result of FIG. 8(a) which shows the results from Lidar. The Lidar measurement of FIG. 8(a) is taken to be the ground truth. than the trajectory estimated with COP-SLAM.

Figure 9A:
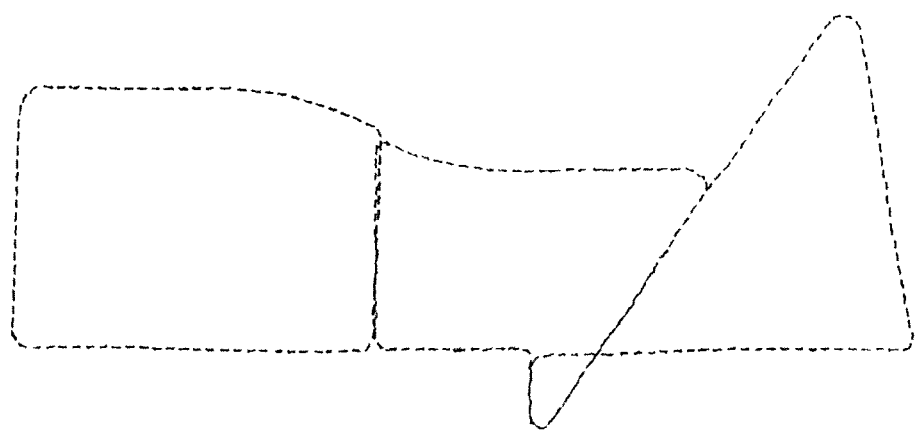
FIG. 9(a) is a plot of the representation of camera pose measured by LIDAR and FIG. 9(b) is a plot of the representation of camera pose determined by a method in accordance with an embodiment of the present invention.
Figure 9B:
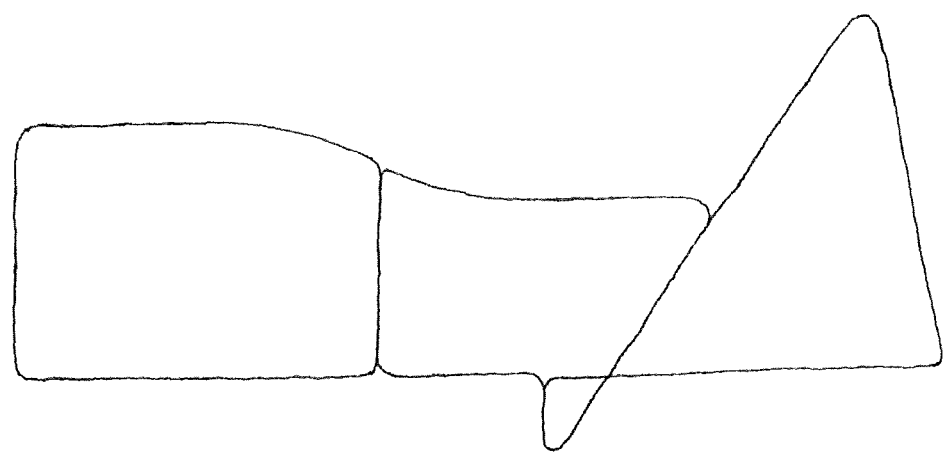

FIGS. 9(a) and 9(b) show the projections from the KITTI 13 data set, where FIG. 9(a) shows the Lidar measurement and FIG. 9(b) shows the results using the above process.

The above examples have related to the tracking of the motion of a camera for SLAM type problems. However, next, the above method for use in video mosaicking will be discussed using the Lie group SL(3). The odometry measurements are obtained by computing the homographies between temporally consecutive frames of the video. In order to detect the loop closures (i.e. when the current video frame overlaps with a past video frame), an image recognition algorithm is first used and then a RANSAC algorithm is applied to compute the homography between the current video frame and the retrieved past video frame.

The objective of a motion averaging algorithm in this application is to align all the video frames, assuming a planar scene, resulting in a global (planar) mosaic of the entire scene.

Figure 10A:
FIG. 10(a) shows some of the input images for a video mosaicking task.
Figure 10B:
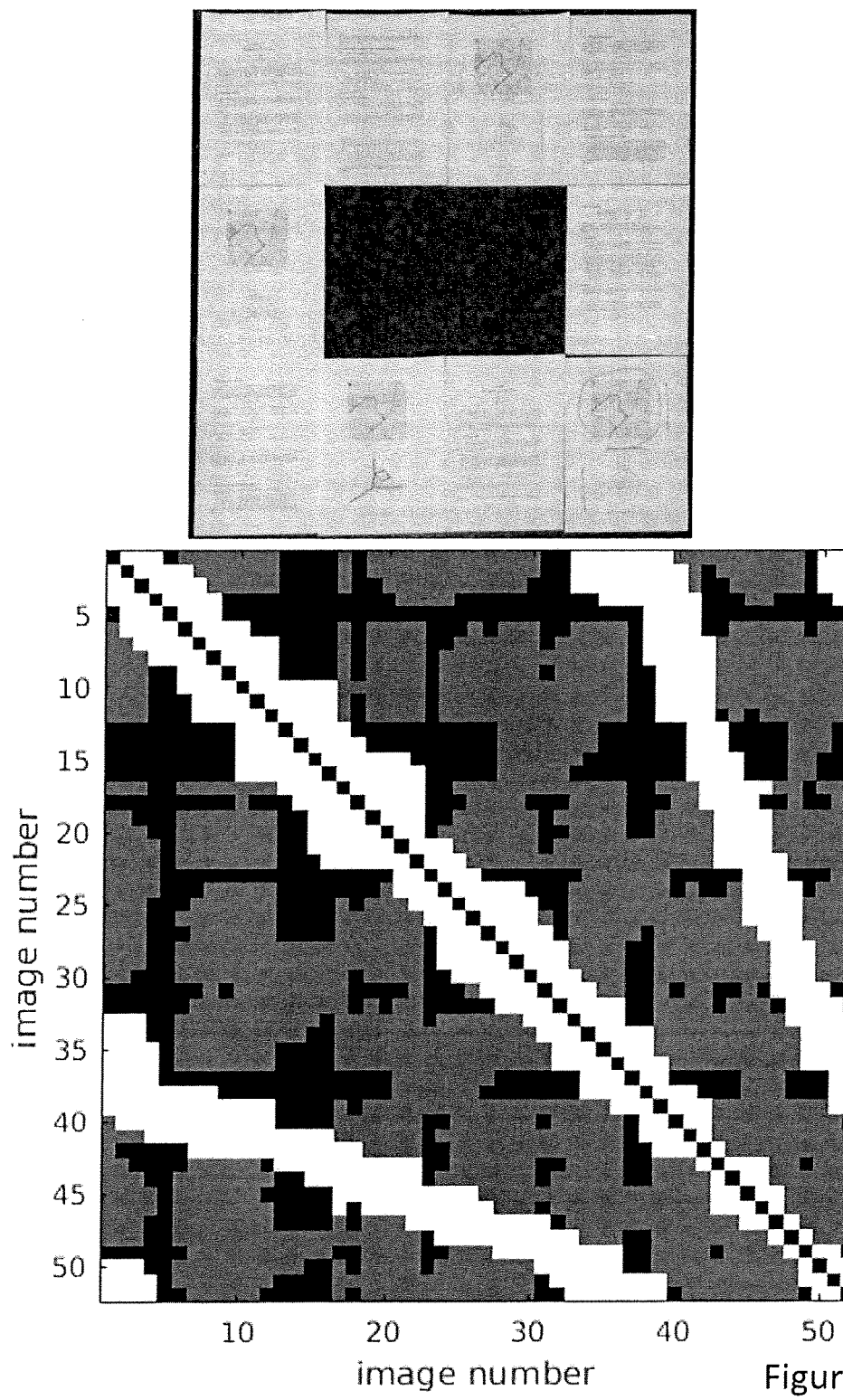
FIG. 10(b) shows the ground truth results and FIG. 10(c) shows the results obtained using a method in accordance with an embodiment of the present invention.
Figure 10C:
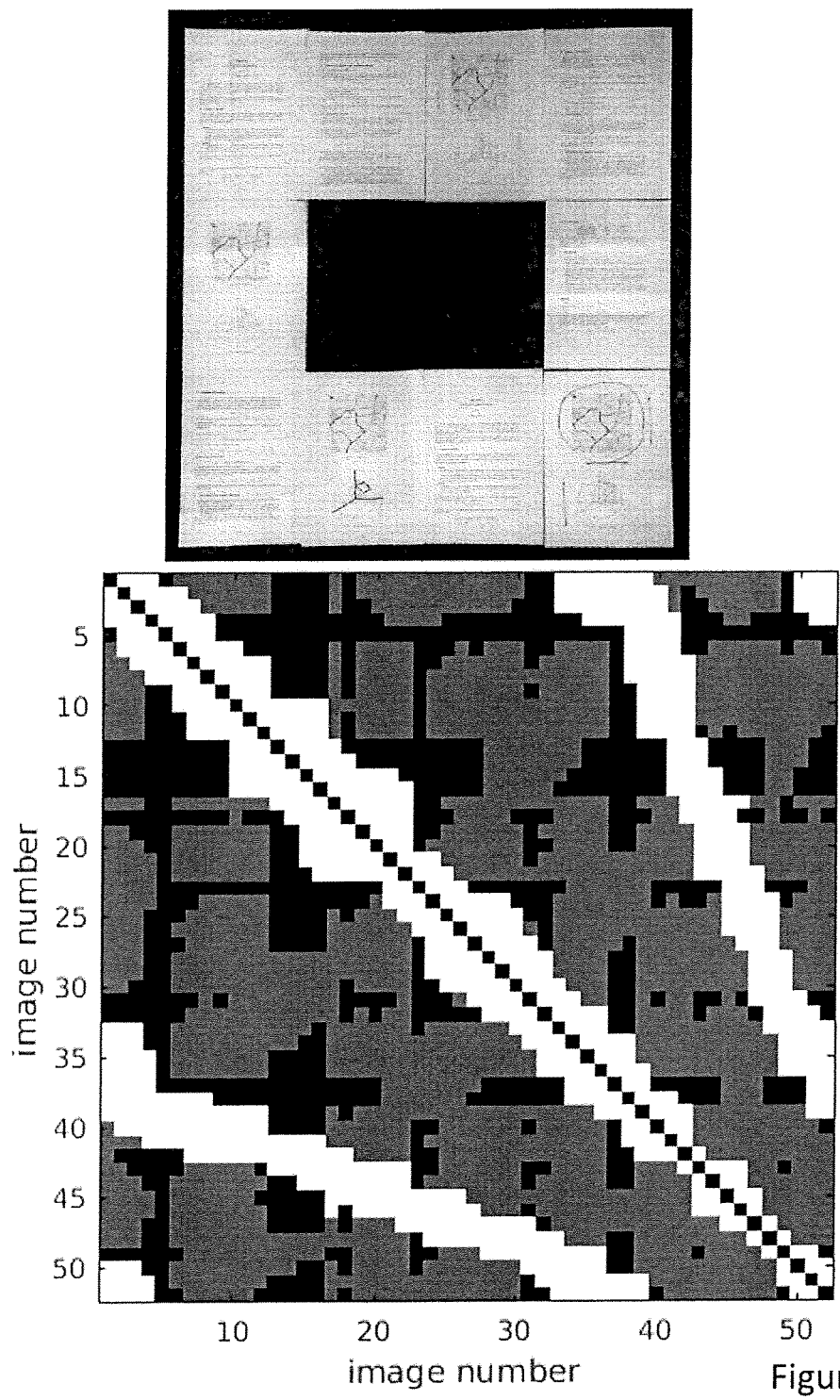

In FIGS. 10(a) to (c) results are presented for video mosaicking (Lie group SL(3)) on the dataset shown in FIG. 10(a). FIG. 10(b) shows the ground truth results and FIG. 10(c) the results obtained using a method in accordance with an embodiment according to the present invention where the posterior distribution is approximated using a few parameters in order to efficiently deal with large scale problems.

However, it can be seen from FIG. 10(c) that the approach produces a mosaic visually very close to the ground truth and also perfectly detects the wrong loop closures. In FIGS. 10(b) and 10(c), the top row shows the mosaic. The bottom row shows the labeling matrices where a white pixel is an inlier, a black pixel corresponds to an unavailable measurement and a gray pixel corresponds to an outlier.

Figure 11:
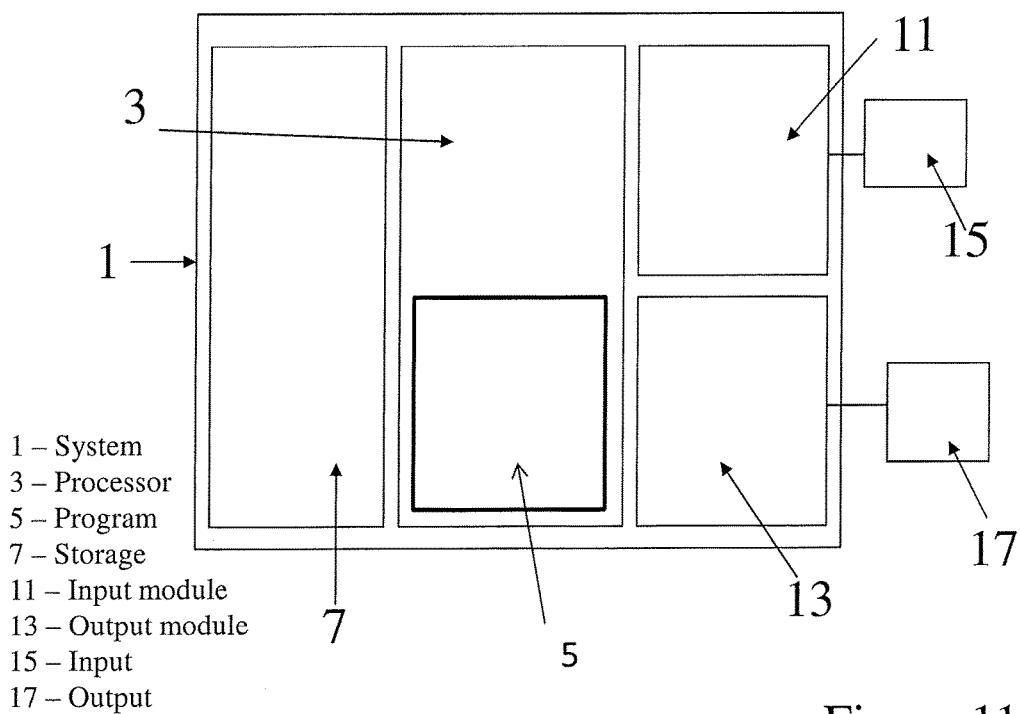
FIG. 11 shows a system in accordance with an embodiment of the present invention.

FIG. 11 is a schematic of an image analysis system.

The system 1 comprises a processor 3 which comprises a program 5 which receives input images. The storage 7 stores data that is used by the program 5. Details of what data is stored will be described later.

The system 1 further comprises an input module 11 and an output module 13. The input module 11 is connected to a camera output or other image data stream. The type of data that is input may take many forms. In one embodiment, the data is raw image data, for example, 2D image data. In another embodiment, 3D point clouds are received by the system, in a yet further embodiment the system is provided with odometry and loop closure measurements. If the system is not provided with odometry and loop closure measurements, then program must derive these measurements from the 2D image data or 3D point clouds. Alternatively, the input may be a receiver for receiving data from an external storage medium or a network. However, although this is possible, as the system is primarily designed for on-line use it is expected that the system will be receiving a real-time and live stream of image data.

Figure 12:
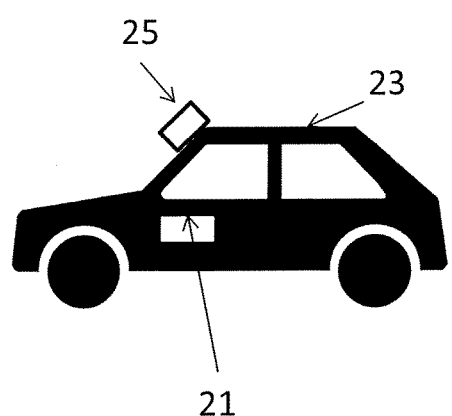
FIG. 12 shows a vehicle using a system in accordance with an embodiment of the present invention.

Connected to the output module 13 is output is an output 17. This output may take many different forms. In an embodiment, it outputs information on the motion of the camera. For example, as shown in FIG. 12, the system 21 is provided on a moving vehicle, 23 receiving image data from camera 25. Although the camera 25 is shown on top of the vehicle, it can be provided anywhere on the car. Also, multiple cameras can be provided for example, for providing assistance with parking etc.

The above method allows fast estimation of the trajectory of a vehicle and the estimation of the 3D position and 3D orientation of the vehicle.

The image data can be from a single camera and a point cloud constructed using monocular techniques. In other embodiments, two or more cameras are used that have a fixed known relationship to each other and a 3D point cloud is determined used stereo techniques.

The output can be in the form of an image showing the movement of the camera with respect to a scene. In other embodiments, the output may be a scene constructed from the camera output which has been assembled using the movement of the camera as determined by the above method. In a further embodiment, the position of the camera may be used as an input into an algorithm such as an autonomous driving algorithm where a decision on how to move the vehicle is made in response to position of the camera or the regeneration of the scene determined from the position of the camera.

Although a car has been shown, any type of vehicle could benefit from this algorithm, for example, an autonomous vacuum cleaner. Also, in robotics, the method could be used to accurately control the position of a robot arm.

As the memory requirements for the above method are relatively low. The method can be applied to limited memory devices such as mobile devices, embedded devices.

While certain embodiments have been described, these embodiments have been presented by way of example only, and are not intended to limit the scope of the inventions.

Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A method of determining the movement of a camera, wherein the movement is expressed in terms of an absolute transformation of the camera state from a reference state, the method comprising:
   receiving a stream of video images captured from said camera;
   producing a stream of odometry measurements from said video images determining a relative transformation of the camera state between consecutive images or consecutive sets of images;
   producing a stream of loop closure measurements from said video images by determining the relative transformation of the camera state between non-consecutive images or non-consecutive sets of images;
   estimating the absolute transformation of the camera state from a posterior distribution of the relative transformations over the odometry measurements and the loop closure measurements, wherein the posterior distribution is approximated by a factorised distribution which assumes that the relative transformations are mutually independent.

2. A method according to claim 1, operating to filter the odometry measurements by processing the loop closure measurements one by one.

3. A method according to claim 1, wherein the factorised distribution is re-estimated each time a new loop closure measurement is received.

4. A method according to claim 3, wherein the parameters of the factorised distribution are retained after each estimate.

5. A method according to claim 4, wherein only the relative transformations that are contained within the loop to which the loop closure measurement relates are updated.

6. A method according to claim 4, wherein the parameters are the estimated mean and covariance of the relative transformations.

7. A method according to claim 4, wherein raw odometry measurements and loop closure measurements are not retained once the parameters for the updated factorised distribution have been determined.

8. A method according to claim 1, further comprising determining whether a produced loop closure measurement is valid by comparing it with the previous values for the parameters of the factorised distribution for the said loop and a gating threshold.

9. A method according to claim 1, wherein at least one further camera is provided with a fixed relationship to the said camera and the odometry measurements and the loop closure measurements are provided from the said camera and the aid at least one further camera using stereo methods.

10. A method according to claim 1, wherein the video images obtained by the camera are combined to determined 3D point clouds and said odometry measurements and loop closure measurements are determined from said 3D point clouds.

11. A method of claim 1, wherein the odometry measurement and loop closure measurements are determined from 2D homographies determined between 2D image frames.

12. A method of video mosaicking, the method comprising moving a camera over an area, obtaining image data from said camera and estimating the absolute transformation of the camera using the method of claim 11, wherein the absolute transformation of the camera position is used to determine the position of the camera with respect to the area, and aligning the frames of video using the position of the camera from the determined absolute transformations.

13. A method of simultaneous localisation and mapping, the method comprising moving a camera in a region, obtaining image data from said camera and determining the movement of the camera using the method of claim 1, wherein the camera state is the camera pose, the method further comprising mapping the region using the image data from the camera and the camera pose.

14. A method according to claim 13, wherein the camera is located on a moving object.

15. A method according to claim 1, wherein the factorised distribution is determined by using a variational Bayes approximation.

16. A method according to claim 15, wherein the variational Bayes approximation is determined using the Kullback-Leibler divergence.

17. A method according to claim 15 wherein a Gauss Newton algorithm is used to minimise the cost function induced by the variational Bayes approximation.

18. A method according to claim 1, wherein it is assumed that the noise in the relative transformation estimates is mutually independent.

19. A non-transitory computer readable medium carrying executable instructions which when executed on a processor cause the processor to carry out a method according to claim 1.

20. A system for determining the movement of a camera, wherein the movement is expressed in terms of an absolute transformation of the camera state from a reference state, the system comprising a processor adapted to:
  receive a stream of video images captured from a camera;
  produce a stream of odometry measurements from said video images determining a relative transformation of the camera state between consecutive images or consecutive sets of images;
  produce a stream of loop closure measurements from said video images by determining the relative transformation of the camera state between non-consecutive images or non-consecutive sets of images; and
  estimate the absolute transformation of the camera state from a posterior distribution of the relative transformations over the odometry measurements and the loop closure measurements, wherein the posterior distribution is approximated by a factorised distribution which assumes that the relative transformations are mutually independent.

* * * * *